US011722812B2

(12) United States Patent
Schmidt et al.

(10) Patent No.: US 11,722,812 B2
(45) Date of Patent: *Aug. 8, 2023

(54) NON-BLOCKING DUAL DRIVER EARPHONES

(71) Applicant: Magic Leap, Inc., Plantation, FL (US)

(72) Inventors: Brian Lloyd Schmidt, Bellevue, WA (US); David Thomas Roach, Plantation, FL (US); Michael Z. Land, Mill Valley, CA (US); Richard D. Herr, Wilton Manors, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,579

(22) Filed: Nov. 2, 2021

(65) Prior Publication Data
US 2022/0109933 A1 Apr. 7, 2022

Related U.S. Application Data

(63) Continuation of application No. 15/941,361, filed on Mar. 30, 2018, now Pat. No. 11,190,867.
(Continued)

(51) Int. Cl.
*H04R 1/10* (2006.01)
*H04R 5/033* (2006.01)
(Continued)

(52) U.S. Cl.
CPC ............ *H04R 1/1066* (2013.01); *H04M 1/05* (2013.01); *H04M 1/6058* (2013.01);
(Continued)

(58) Field of Classification Search
CPC .... H04R 1/1016; H04R 5/033; H04R 1/1075; H04R 1/26
(Continued)

(56) References Cited

U.S. PATENT DOCUMENTS

| 4,852,988 A | 8/1989 | Velez |
| 6,048,305 A | 4/2000 | Bauman |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Japanese Final Office Action dated Jul. 29, 2022, for JP Application No. 2019-552996, with English translation, 7 pages.
(Continued)

*Primary Examiner* — Alexander Krzystan
(74) *Attorney, Agent, or Firm* — Morrison & Foerster LLP

(57) ABSTRACT

A head-worn sound reproduction device is provided in the form of left and right earphones, which can either be clipped to each ear or mounted on other headgear. The earphones deliver high fidelity audio to a user's eardrums from near-ear range, in a lightweight form factor that is fully "non-blocking" (allows coupling in and natural hearing of ambient sound). Each earphone has a woofer component that produces bass frequencies, and a tweeter component that produces treble frequencies. The woofer outputs the bass frequencies from a position close to the ear canal, while the tweeter outputs treble frequencies from a position that is either close to the ear canal or further away. In certain embodiments, the tweeter is significantly further from the ear canal than the woofer, leading to a more expansive perceived "sound stage", but still with a "pure" listening experience.

7 Claims, 14 Drawing Sheets

Related U.S. Application Data

(60) Provisional application No. 62/478,938, filed on Mar. 30, 2017.

(51) Int. Cl.

| | | |
|---|---|---|
| *H04M 1/05* | (2006.01) | |
| *H04M 1/60* | (2006.01) | |
| *H04S 7/00* | (2006.01) | |
| *H04R 1/02* | (2006.01) | |
| *H04R 3/14* | (2006.01) | |
| *H04R 5/04* | (2006.01) | |
| *H04S 1/00* | (2006.01) | |
| *G02C 11/00* | (2006.01) | |
| *G02C 11/06* | (2006.01) | |
| *H04R 1/34* | (2006.01) | |
| *H04R 1/28* | (2006.01) | |
| *H04R 1/26* | (2006.01) | |

(52) U.S. Cl.
CPC ............ *H04R 1/028* (2013.01); *H04R 1/105* (2013.01); *H04R 1/1008* (2013.01); *H04R 1/1041* (2013.01); *H04R 1/1075* (2013.01); *H04R 1/1083* (2013.01); *H04R 3/14* (2013.01); *H04R 5/0335* (2013.01); *H04R 5/04* (2013.01); *H04S 1/007* (2013.01); *H04S 7/304* (2013.01); *G02C 11/06* (2013.01); *G02C 11/10* (2013.01); *H04R 1/1016* (2013.01); *H04R 1/26* (2013.01); *H04R 1/2842* (2013.01); *H04R 1/2857* (2013.01); *H04R 1/345* (2013.01); *H04R 2499/15* (2013.01); *H04S 2400/11* (2013.01); *H04S 2400/15* (2013.01); *H04S 2420/01* (2013.01)

(58) Field of Classification Search
USPC ................................ 381/382, 184, 376, 373
See application file for complete search history.

(56) References Cited

U.S. PATENT DOCUMENTS

| | | |
|---|---|---|
| 6,433,760 B1 | 8/2002 | Vaissie |
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,347,551 B2 | 3/2008 | Fergason et al. |
| 7,488,294 B2 | 2/2009 | Torch |
| 8,111,854 B2 | 2/2012 | Peng |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,036,851 B2 | 5/2015 | Peng |
| 9,274,338 B2 | 3/2016 | Robbins et al. |
| 9,292,973 B2 | 3/2016 | Bar-zeev et al. |
| 9,720,505 B2 | 8/2017 | Gribetz et al. |
| 9,860,645 B1 | 1/2018 | Tsui |
| 10,013,053 B2 | 7/2018 | Cederlund et al. |
| 10,025,379 B2 | 7/2018 | Drake et al. |
| 10,264,378 B2 | 4/2019 | Ikeda |
| 11,190,867 B2 | 11/2021 | Schmidt et al. |
| 2003/0030597 A1 | 2/2003 | Geist |
| 2006/0023158 A1 | 2/2006 | Howell et al. |
| 2007/0280496 A1 | 12/2007 | Karamuk et al. |
| 2008/0253604 A1 | 10/2008 | Yamagishi et al. |
| 2009/0052702 A1 | 2/2009 | Murphy |
| 2009/0220113 A1 | 9/2009 | Tiscareno |
| 2010/0260356 A1 | 10/2010 | Teramoto |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0194419 A1 | 8/2012 | Osterhout et al. |
| 2012/0237074 A1 | 9/2012 | Aase |
| 2013/0177193 A1 | 7/2013 | Orzel |
| 2014/0195918 A1 | 7/2014 | Friedlander |
| 2015/0022542 A1 | 1/2015 | Baba |
| 2015/0168731 A1 | 6/2015 | Robbins |
| 2016/0261964 A1 | 9/2016 | Ikeda |
| 2016/0379618 A1 | 12/2016 | Torres et al. |
| 2018/0133431 A1 | 5/2018 | Malchano et al. |
| 2018/0192228 A1* | 7/2018 | Woelfl .................... H04S 7/304 |
| 2018/0324516 A1 | 11/2018 | Campbell et al. |
| 2019/0026527 A1 | 1/2019 | He et al. |
| 2019/0356991 A1* | 11/2019 | Farver ................... A61F 11/145 |

FOREIGN PATENT DOCUMENTS

| | | | |
|---|---|---|---|
| CA | 2388766 | A1 | 12/2003 |
| EP | 1681904 | A1 | 7/2006 |
| JP | 5324624 | | 8/1976 |
| JP | 5323601 | A | 3/1978 |
| JP | 5324624 | U | 3/1978 |
| JP | 60101896 | | 7/1985 |
| JP | 2007235922 | A | 9/2007 |
| JP | 2008141691 | A | 6/2008 |
| WO | 2009095965 | A1 | 8/2009 |
| WO | 2013030437 | A1 | 3/2013 |
| WO | 2017034860 | A1 | 3/2017 |

OTHER PUBLICATIONS

Chinese Notice of Allowance dated Aug. 17, 2021, for CN Application No. 201880022883.2, with English translation, 4 pages.
Chinese Office Action dated Dec. 11, 2020, for CN Application No. 2018800228832, with English translation, 29 pages.
ELTGroup. (2019). "OGS Open-guided-sound," Nashville, TN, located at:https://b0f0b777-2363-4b52-8877-74d8f5b69857.filesusr.com/ugd/69ba6d_13495986a0d94cbb95529f8e906af918.pdf, last visited on Jun. 25, 2021.
ELTGroup. (date unknown). website: http://www.ogsearphone.com/, last visited on Jun. 28, 2021, one page.
European Communication and Search report, dated Dec. 10, 2020, for EP Application No. 18774655.7, fifteen pages.
European Search report, dated Mar. 17, 2021, for EP Application No. 18774655.7, 14 pages.
Final Office Action dated Aug. 11, 2020, for U.S. Appl. No. 15/941,361, filed Mar. 30, 2018, twenty five pages.
Final Office Action dated Nov. 20, 2019, for U.S. Appl. No. 15/941,361, filed Mar. 30, 2018, twenty three pages.
International Search Report and Written Opinion dated Aug. 24, 2018, for PCT Application No. PCT/US2018/025386 filed Mar. 30, 2018, fifteen pages.
Non-Final Office Action dated Apr. 24, 2019, for U.S. Appl. No. 15/941,361, filed Mar. 30, 2018, twenty pages.
Non-Final Office Action dated Dec. 10, 2020, for U.S. Appl. No. 15/941,361, filed Mar. 30, 2018, twenty five pages.
Non-Final Office Action dated Mar. 18, 2020, for U.S. Appl. No. 15/941,361, filed Mar. 30, 2018, twenty-three pages.
Notice of Allowance dated Aug. 4, 2021, for U.S. Appl. No. 15/941,361, filed Mar. 30, 2018, eight pages.
Notice of Allowance dated Mar. 30, 2021, for U.S. Appl. No. 15/941,361, filed Mar. 30, 2018, seven pages.
Japanese Office Action dated Apr. 19, 2022, for JP Application No. 2019-552996, with English translation, 11 pages.
Indian Office Action dated Feb. 14, 2022, for IN Application No. 201947037285, with English translation, 6 pages.
Israeli Office Action dated Dec. 19, 2021, for IL Application No. 269563, with English translation, 8 pages.
Korean Office Action dated Mar. 28, 2022, for KR Application No. 10-2019-7031890, with English translation, 15 pages.
Korean Notice of Allowance dated Jun. 30, 2022, for KR Application No. 10-2019-7031890, with English translation, 3 pages.
Examination Report dated Apr. 26, 2022, for Australian Application No. 2018243565, three pages.

(56) References Cited

OTHER PUBLICATIONS

Israeli Notice of Allowance dated May 30, 2022, for IL Application No. 269563, with English translation, six pages.
Korean Notice of Allowance dated Mar. 31, 2023, for KR Application No. 10-2022-7034205, with English translation, 4 pages.
Jacob, R. "Eye Tracking in Advanced Interface Design", Virtual Environments and Advanced Interface Design, Oxford University Press, Inc. (Jun. 1995).
Korean Office Action dated Dec. 23, 2022, for KR Application No. 10-2022-7034205, with English translation, 5 pages.
Rolland, J. et al., "High-resolution inset head-mounted display", Optical Society of America, vol. 37, No. 19, Applied Optics, (Jul. 1, 1998).
Tanriverdi, V. et al. (Apr. 2000). "interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
European Office Action dated Mar. 2, 2023, for EP Application No. 18774655.7, seven pages.

\* cited by examiner

NON-BLOCKING DUAL DRIVER EARPHONES

CROSS-REFERENCE TO RELATED APPLICATIONS

This application claims benefit of U.S. patent application Ser. No. 15/941,361, filed Mar. 30, 2018, which claims benefit of U.S. Provisional Patent Application No. 62/478,938, filed Mar. 30, 2017, the contents of which are incorporated by reference herein in their entirety.

FIELD OF THE INVENTION

The invention pertains to head-worn audio speaker systems.

BACKGROUND

The field of head-worn (head-wearable) sound reproduction encompasses a number of different types of apparatuses which have developed since the early days of electronic audio. The most common of types of head worn sound reproduction apparatuses include: around-the-ear headphones which are speakers mounted on cups that encompass the ears and rest on the head; over-the-ear headphones which are speakers with pads that press against the ear; earphones colloquially know as earbuds which fit into the outer ear; and in-ear headphones or monitors which are inserted into the ear canal. In some cases the head-worn sound reproduction apparatus include a supporting band that goes over the head. In other cases the head-worn sound reproduction apparatus includes clips that hang off of each ear, and in yet other cases the head-worn sound reproduction apparatus is held in place by the ear canal itself.

Recently head worn sound reproduction apparatuses have been integrated into virtual reality and augmented reality headgear. These devices, such as the Oculus Rift made by Oculus VR of Menlo Park, Ca and Meta typically have some kind of wearable eyewear that includes built-in or attached speakers, such as over-the-ear earphones, or speakers mounted in or on the eyewear arms or frame.

Historically within the field of head-worn sound reproduction, there have been two alternative goals driving the development of products: (1) High Fidelity Devices, where the goal is to reproduce as accurately as possible the full frequency spectrum of the audio being played; and (2) "Non-Blocking" Devices, where the goal is to allow external sounds from the surroundings to be perceived unaffected. These two goals have tended to work against one another (be mutually exclusive), resulting in a functional divide within the industry that has persisted during the course of decades of audio technology development.

When high fidelity is the goal, and being truly non-blocking is not critical, head-worn sound reproduction has excelled for a long time at providing effective products. For example, full-size headphones have been used by professional sound engineers for the better part of a century. These devices cover both ears with around-the-ear cups that provide high-fidelity audio, but are ineffective at being non-blocking, which is to say that they impair the fidelity with which ambient sounds in the environment may be heard. Likewise, earbuds (ubiquitous in recent years) that insert partially or deeply into the ear canal depend on a "good seal" of the ear canal so that the ear canal can act as a closed chamber that resonates bass. The around-the-ear cups and the sealing earbuds, block the free flow air (i.e., interrupt "fluid communication") between the ambient environment and the ear canal, and in so doing also substantially diminish the hearing of ambient sounds. The earbud manufactured by Apple of Cupertino, Calif. is an example of a consumer earbud, while professional "in-ear monitor" products are available from companies such as Shure of Niles, Ill., Sennheiser of Wedemark, Germany and Westone of Colorado Springs, Colo. Like full-size headphones, these devices can sound great, but are ineffective at being non-blocking. In fact in many cases, the intent is to block out outside sound as much as possible so the user can be completely immersed in the content.

In recent years, perhaps in reaction to the growing number of people wearing head-worn audio reproduction in public, whose inability to hear their surroundings can lead to social friction or pose a danger to themselves or others, headphone and earphone companies have been marketing more products they refer to as "open-air", "open-back" or "non-occluding". These products typically have a form factor similar to their "occluding" and "closed-air" cousins, but with the inclusion of pass-through tunnels, openings or other features that enable greater amounts of sound to pass through from the outside world. These pass-through tunnels, openings or other features provide a restricted path which limits the fidelity with which ambient sounds may be heard. However in spite of their marketing terminology, typically these products still block or alter the incoming sound from the outside world to a significant degree. One need only compare the experience of wearing or not wearing one of these devices, with no audio playing, to observe the degree to which one can hear or "feel" a difference in the perception of outside sound.

Within the past couple of years, a new type of sealed earbuds has emerged which has external microphones for capturing external sound from the proximate environment, which is then mixed with other audio being output via the earbuds so that the external sound can be more clearly heard. One example of such earbuds have been sold under the name "Here" by Doppler Labs of San Francisco, Calif. While this approach can re-create the gist of the surrounding sound, even with great accuracy, the fact that it is reproduced rather than natural removes a great deal of the nuance and subtlety that humans hear naturally.

The aforementioned devices still fall very far short of being able to reproduce an experience that matches what people are accustomed to hearing and sensing of their environment when their ears are not blocked. In short, the high fidelity "pass through" devices fall short of being truly non-blocking, because they all change the perception of incoming natural sound to a noticeable extent. The listener tends to feel "cut off" from the surrounding space and listening within a greatly diminished sound stage.

On the other side of the high-fidelity/non-blocking divide, head-worn sound reproduction has been successful at being non-blocking when audio fidelity is not critical.

"Open air" hearing aids are a ubiquitous example. There are a variety of different form factors for hearing aids, and while not all of them are non-blocking, over time there has been an increasing goal to let incoming natural sound enter the ear canal (along with captured and amplified sound that is the hearing aid's primary purpose). Open air hearing aids typically use a behind-the-ear form factor, where the majority of the device rests behind the ear, and a small tube connects to an ear mold or ear piece. Some ear molds fully block the ear canal opening, and others don't, so this form factor covers a range across the fidelity vs. openness tradeoff. An example toward the open side is a "balanced armature" driver mounted in a hollow cylinder, such that the driver essentially "floats" in the middle of the ear canal, leaving the ear canal effectively un-blocked in terms of perception of external sounds. However the audio fidelity of these devices is well below high fidelity, especially in terms of high fidelity bass. While this may not be a significant problem for hearing aids (since hearing loss often affects high frequencies more than bass), these designs fall far short as a delivery system for electronically sourced audio, such as music, movies, games, etc.

Another approach to achieving non-blocking head-worn audio is represented by the headsets designed for dispatchers, or more recently certain headsets designed for talking on cell phones in which just one ear is covered by an audio source, leaving the other ear uncovered and without audio, essentially "splitting 50-50" between the competing goals of fidelity and openness (by using one ear for each goal). As with hearing aids, this approach is effective for certain scenarios, but falls far short as a real solution, since it doesn't really succeed in either goal.

Other applications for sound reproduction systems include virtual reality, augmented reality and mixed reality. In the case of virtual reality, augmented reality and mixed reality, the requirements for the audio parallel those of the visual display. In the case of virtual reality, where the visual display blocks out light from the outside world, it's desirable for the audio to do the same with sound, so over-the-ear headphones and tightly sealed earbuds tend to be effective solutions. However with augmented reality and mixed reality, where the visual display allows light from the outside world to enter, it would be desirable (at least most of the time) for the audio to do the same for sound. Thus the in the case of augmented reality devices speakers could be mounted on either side of the device, and used to project sound to the user's ears from up to several centimeters away. Such configurations would be expected to excel at being non-blocking, but leave much to be desired in terms of audio fidelity. The reproduction of bass frequencies in particular tends to be an especially weak area, which works against the overall goal of suspension of disbelief.

One of the problems with "open back" or "open air" high fidelity headphones is that by allowing sound to come in, they are also allowing sound to get out. This means that whatever audio is being listened to is not private, but is projected out into the surroundings, at least to some degree. Often this is a weak and tinny-sounding projection, but still clearly audible to anyone nearby when there is little background noise. At least for some users, the gains offered by these products (such as a wider "sound stage" and less of that "blocked off from the world" feeling) are important enough to offset this loss in privacy.

Devices that produce bass frequencies at hi-fi quality face a tradeoff between device weight and sealing the ear canal. This tradeoff derives from the large sizes of the bass waveforms (close to 9 meters for the low note on an acoustic bass). The essence of this tradeoff is the premise that small and lightweight devices (such as earbuds weighing less than an ounce) can only produce convincing bass by blocking the ear canal. The reasoning goes that once the sound source moves outside the ear canal, it's much harder to produce an airborne waveform strong enough to register as hi-fi bass, and the size and weight of the hardware needed to do this requires a form factor such as full-size headphones (weighing up to a pound or more).

None of the head-worn sound reproduction devices discussed above are able to provide a fully high fidelity listening experience and a fully non-blocking listening experience at the same time; there is always a substantial compromise for either one side or the other, or both. Yet in recent years, personal listening devices and mobile phones have driven an explosion in the adoption of head-worn audio reproduction, with more and more people spending more and more time in more and more places with their ears partially or fully blocked. As a result, people everywhere are becoming more cut off from their surroundings, resulting in social friction, safety risks, and often hearing damage.

What is needed is a head-worn sound reproduction device in a small and lightweight form factor that produces a high fidelity listening experience (including high fidelity bass) while also being non-blocking such that incoming sounds and the perception of the surrounding space are substantially not affected. What is also needed is a head-worn sound reproduction device that offers a more expansive and well-defined "sound stage", and thus an improved listening experience, compared to what is generally available from head-worn listening devices.

SUMMARY

A head-worn (head-wearable) sound reproduction device including a left and right woofer component, a left and right tweeter component, one or more mounting attachments for holding the left and right woofer and tweeter components in position, and an input circuitry component. The woofer component is mounted just outside the ear canal, the tweeter component is mounted outside the ear canal, and both are driven through input circuitry that can be configured in various ways to receive a stereo input signal from an external source. The design and placement of these components results in a high fidelity listening experience that includes high fidelity bass, while also being non-blocking such that the user's perception of ambient sounds and the surrounding space are substantially undiminished.

The disclosed devices allow a user to move about in the world while listening to high fidelity audio, such as music, movies, games, etc., without having their perception of the surrounding space diminished by a physical blockage. This outcome neutralizes one of the longstanding functional tradeoffs that has been present in the head-worn audio industry since its inception, which is that devices have always had to compromise in either their high fidelity performance or their non-blocking effectiveness. The present device meets both goals without compromising either.

In addition, certain disclosed devices can be configured with the tweeter located further from the ear canal than the woofer, providing an unexpectedly appealing "expansion of the sound stage". This effect is not just a sound stage that's quantitatively bigger than those of headphones or earbuds—it's also qualitatively different. Preexisting headphones and earbuds make sounds feel like they're coming from inside or close to your head ("small sound stage")—on the other hand they don't add any environmental ambience, so the sound is "pure" (only what is delivered). By contrast, traditional external speakers make sounds feel like they're coming from out in the environment ("large sound stage"), but the sound is "impure" because it's also mixed with environmental ambience (reflections, reverb) by the time it reaches the ears.

Unlike previous approaches, the present device in its "expanded" configuration produces the sensation that sounds are emanating from out in the environment ("large sound stage"), but the sound is nonetheless "pure" when it reaches the ears in that it bears no signs of environmental ambience. The listening experience is not just an interpolation between the two familiar listening experiences of audio on headphones or external speakers. Hearing a "large sound stage" with "no environmental ambience" is both unfamiliar and unexpected, but it's also quite pleasing and "organic" in its effect, as if this method of delivering audio fits more naturally with the human auditory system than either traditional earphones or external speakers.

Other variations of the disclosed device include but are not limited to: different designs for the woofer component and tweeter component; passive, active, and active bi-amp configurations for the input circuitry; analog, USB and wireless variations for the active input circuitry; and various forms of mounting attachments. In addition, an embodiment of a "mixed reality" device that incorporates the audio device in various ways is disclosed.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the following discussion and associated figures, depictions of both physical devices and electronic components represented by blocks are presented, often both within a single figure. In cases where both are shown within a single figure, the physical devices are presented over a background of a human ear or head, to distinguish them from the block diagram depiction of the electronic components.

The depictions of electronic components should be understood as being "schematics". For example, an electronic component that is shown in schematic form "below" two physical earpieces may in fact be implemented in various ways which can include: mounted in or on either earpiece, split among the two earpieces, provided in a small panel on the audio cable, provided as a separate control in a wireless system, any combinations of the above, etc. Moreover, to the degree any distinctions (explicit or implied) are made regarding signal processing or data processing being done within software processors versus hardware chips, such distinctions are not elemental to the functionality being disclosed, and both approaches can be effective.

Likewise, lines with arrows are used in the figures to represent "audio signal conduits" that convey audio signals among or between electronic or physical components. The audio signal conduits may be implemented in whole or in part in various ways which can include: analog audio cables, digital audio cables, wireless audio signals, traces on a circuit board, function calls in a software process, custom connectors, combinations of the above, etc.

More generally throughout this disclosure, various implementation and configuration options for the disclosed devices are presented. The description does not specify in detail all the possible permutations of these options, both in terms of the number of options available for a given component, and the number of combinations made available by swapping in different options for the different components. Rather, due to space constraints, only a representative set of options and combinations has been included. However the device is not limited to just those permutations disclosed, and many other combinations and permutations are contemplated. It is an intention of the design of the device to allow different options and permutations for the components to be combined in different ways to achieve particular goals or aims.

Figure 1A:
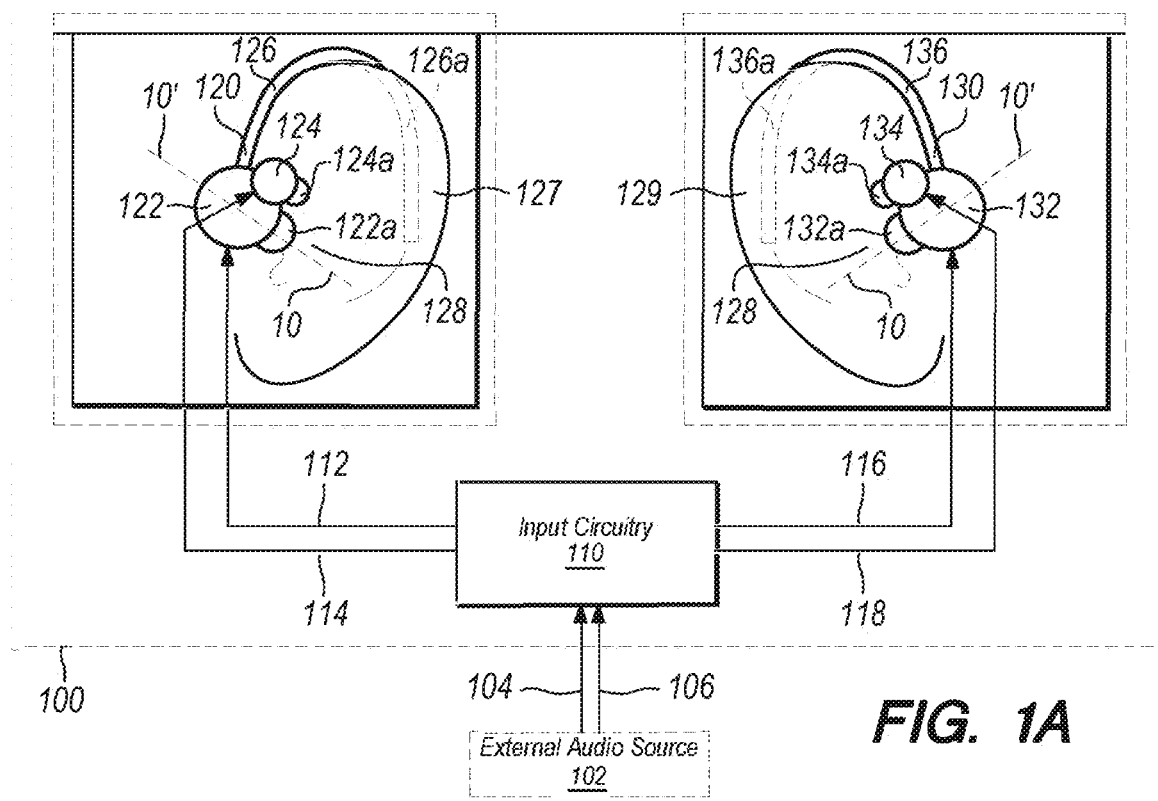
FIG. 1A shows a head-worn (head-wearable) sound reproduction device with ear-clip mounting attachments, with both a woofer component and a tweeter component close to an ear canal.

FIG. 1A shows a head-worn sound reproduction device 100 including an input circuitry block 110, a left earphone 120, a right earphone 130, and audio signal conduits 112, 114, 116, 118 including a left woofer audio signal conduit 112, a left tweeter audio signal conduit 114, a right woofer audio signal conduit 116 and a right tweeter audio signal conduit 118. In addition, an external audio source 102 which may not be part of the device 100 provides a stereo audio signal that is output via a left channel audio signal conduit 104 and a right channel audio conduit 106 as input to the head-worn sound reproduction device 100. The external audio source 102 can, for example, be any of a number of types of devices that are used to generate and/or play back audio, such as smart phones, music players, game consoles, tablets, computers, virtual reality devices, augmented or mixed reality devices, etc.

The input circuitry block 110 can be internally configured in various ways (as discussed further herein below). The function of the input circuitry is to receive the stereo audio signal from the external audio source 102 via the left channel audio signal conduit 104 and the right channel audio signal conduit 106 and to couple signals derived from the stereo audio signal to the audio signal conduits 112, 114, 116, 118 that couple signals to the left earphone 120 and the right earphone 130.

Looking more closely at the left earphone 120, it comprises a woofer component 122 with a sound outlet 122a, a tweeter component 124 with a sound outlet 124a, and a left ear-clip mounting attachment 126 with a portion 126a shown behind a left ear 127. The woofer component 122 and tweeter component 124 are mounted to the mounting attachment 126, positioned such that the sound outlet 122a for the woofer component 122 and the sound outlet 124a for the tweeter component 124 are both within approximately a centimeter from the center of the user's ear canal opening 128. A variety of different options and construction approaches for implementing the woofer component 122 and tweeter component 124 can be effective within the context of the present device, and some of these options are presented in later figures.

Referring again to the two audio signal conduits 112 and 114 that convey audio signals from the input circuitry block 110 to the left earphone 120, it can be seen that each conduit conveys its audio signal to a different internal component in the left earphone 120. Specifically, audio signal conduit 112 carries an audio signal to the woofer component 122, and audio signal conduit 114 carries an audio signal to the tweeter component 124. While the audio signals on audio signal conduits 112 and 114 do not inherently need to be different, there are options shown in later figures for producing different versions of these audio signals which are optimized for their respective woofer and tweeter destinations. The right side of FIG. 1A, which includes the right earphone 130 and audio conduits 116 and 118 is substantially the same as what was just described, but for the other ear. In the right side of FIG. 1A elements corresponding to elements in the left side of FIG. 1A are labeled with reference numerals that differ from the reference numerals of the corresponding left side elements by the replacement of number 2 in the second digit of each reference numeral by number 3. The right woofer signal conduit 116 is coupled to a right woofer component 132 that includes a sound outlet 132a. The right tweeter signal conduit 118 is coupled to a right tweeter component 134 that includes a sound outlet 134a. A right ear-clip mounting attachment 136 includes a portion 136a that extends behind a right ear 129. A further detailed description is omitted.

Figure 1B:
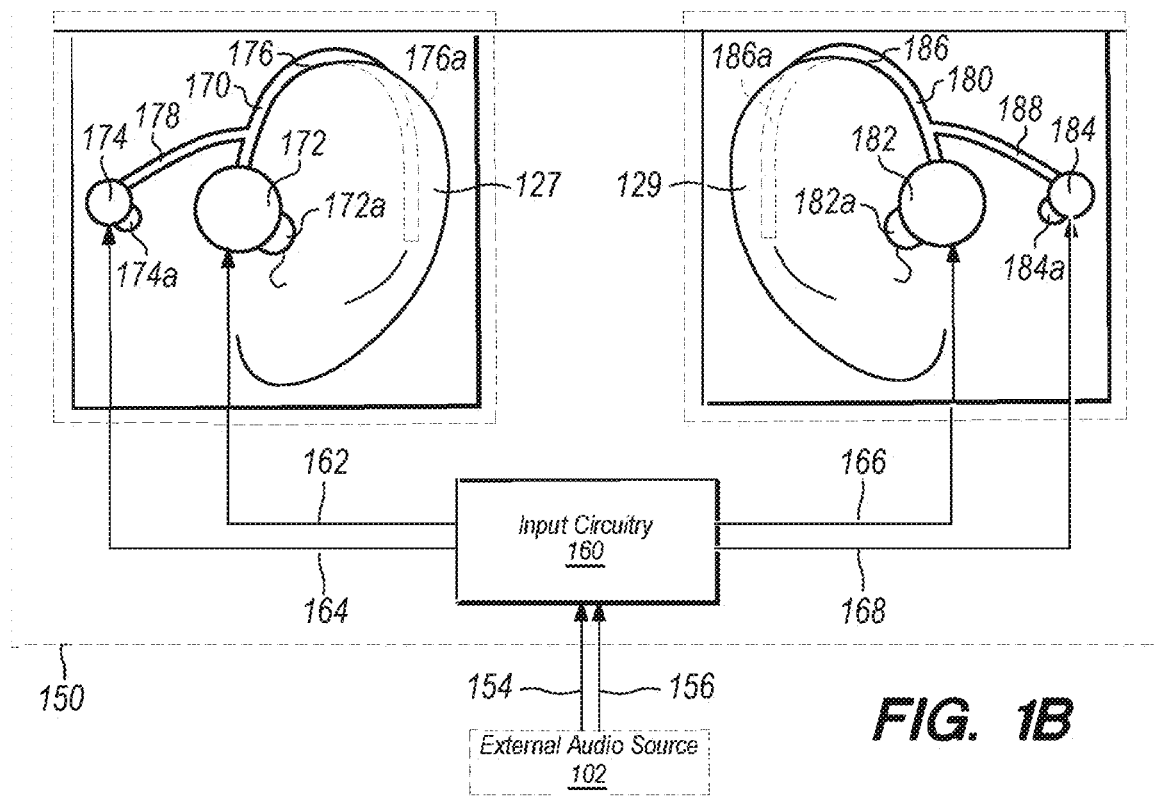
FIG. 1B shows a head-worn (head-wearable) sound reproduction device with ear-clip mounting attachments, with a woofer component close to an ear canal and a tweeter component further away.

FIG. 1B shows a head-worn sound reproduction device 150 including an input circuitry block 160, a left earphone 170, a right earphone 180, and audio signal conduits 162, 164, 166, 168, including a left woofer audio signal conduit 162, a left tweeter audio signal conduit 164, a right woofer audio signal conduit 166 and a right tweeter audio signal conduit 168. In addition, the external audio source 102 which is not part of the device provides a stereo audio signal as input through a left channel audio signal conduit 154 and a right channel audio signal conduit 156. Since significant aspects of device 150 are substantially similar to device 100 in FIG. 1A, the redundant explanations are not repeated. An aspect of device 150 that is not substantially similar to device 100 is the positioning of the tweeter components.

In so far as the left earphone 170 and the right earphone 180 are substantially mirror images of each other, in the interest of brevity, only the left earphone 170 will be described in detail. In the right side of FIG. 1B elements corresponding to elements in the left side of FIG. 1B are labeled with reference numerals that differ from the reference numerals of the corresponding left side elements by the replacement of number 7 in the second digit of each reference numeral by number 8. Referring now to the left earphone 170, a tweeter component 174 and its sound outlet 174a are now located significantly further from the user's ear canal than a woofer component 172 and its sound outlet 172a. An ear-clip mounting attachment 176 is similar to ear-clip 126, but in device 150, the mounting attachment 176 now has an extension 178 that positions the tweeter component 174 further away at about 4 cm from the user's ear canal opening. The mounting attachment 176 also includes a portion 176a that rests behind the left ear 127. The right side of FIG. 1B also shows an equivalent configuration for the right earphone 180, with the mounting attachment 186 now having an extension 188 that positions the tweeter component 184 similarly far away from the right side ear canal opening.

Figure 2A:
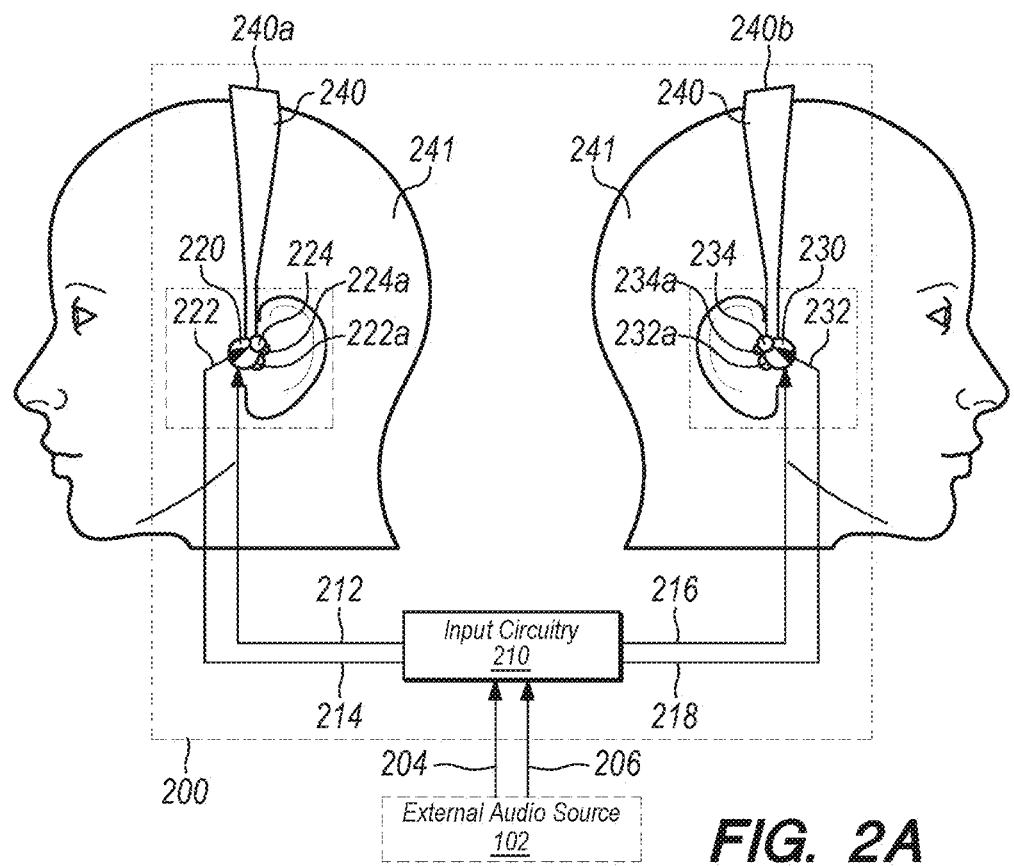
FIG. 2A shows a head-worn (head-wearable) sound reproduction device with a head-spanning mounting attachment, with both the woofer component and tweeter component close to the ear canal.

FIG. 2A shows a head-worn sound reproduction device 200 including an input circuitry block 210, a left earphone 220, a right earphone 230, audio signal conduits 212, 214, 216, 218 including a left woofer audio signal conduit 212, a left tweeter audio signal conduit 214, a right woofer audio signal conduit 216, and a right tweeter audio signal conduit 218, and a head-spanning mounting attachment 240. The head-worn reproduction device 200 is shown in a mounted position on a head 241 for which the device 200 is appropriately sized. In addition, the external audio source 102 which is not part of the device provides a stereo audio signal via a left channel signal conduit 204 and a right channel signal conduit 206 as input. In so far as the left earphone 220 and the right earphone 230 are substantially mirror images of each other, in the interest of brevity, only the left earphone 220 will be described in detail. In the right side of FIG. 2A elements corresponding to elements in the left side of FIG. 2A are labeled with reference numerals that differ from the reference numerals of the corresponding left side elements by the replacement of number 2 in the second digit of each reference numeral by number 3. With reference to the left side of FIG. 2A, the left earphone 220 includes a left woofer component 222 including a sound outlet 222a, and a right tweeter component 224 including a sound outlet 224a. Since significant aspects of device 200 are substantially similar to device 100 in FIG. 1A, the redundant explanations are not repeated. An aspect of device 200 that is not substantially similar to device 100 is the form of the mounting attachment 240.

Unlike in the left and right earphones 120, 130 of FIG. 1A, which each had their own ear-clip mounting attachment 126, 136, the left and right earphones 220, 230 in FIG. 2A do not have an ear-clip mounting attachment as part of the earphone 220, 230. Rather, there is an overall head-spanning mounting attachment 240 that goes over the head, reaching down to the left and right earphones 220, 230 on each side. A left side of this mounting attachment 240a can be seen on the left side of FIG. 2A, and a right side of the mounting attachment 240b can be seen on the right side of FIG. 2A. Aside from this difference in the mounting attachment, and the fact that the woofer and tweeter components are mounted on this head-spanning attachment and not on ear-clips, other aspects of device 200 shown in FIG. 2A (including the placement of the woofer and tweeter components) are substantially similar to the device 100 shown in FIG. 1A.

Figure 2B:
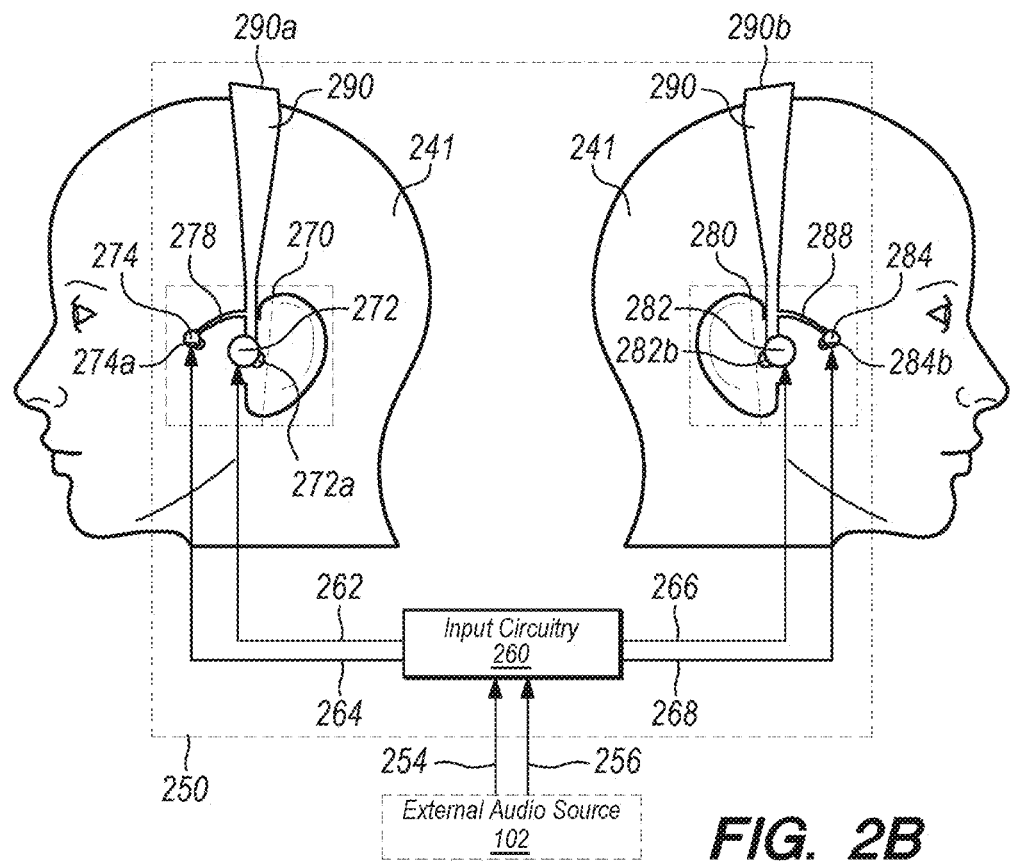
FIG. 2B shows a head-worn (head-wearable) sound reproduction device with a head-spanning mounting attachment, with a woofer component close to an ear canal and a tweeter component further away.

FIG. 2B shows a head-worn sound reproduction device 250 including an input circuitry block 260, a left earphone 270, a right earphone 280, audio signal conduits 262, 264, 266, 268 including a left woofer audio signal conduit 262, a left tweeter audio signal conduit 264, a right woofer audio signal conduit 266, and a right tweeter audio signal conduit 268, and a head-spanning mounting attachment 290. The head-worn reproduction device 250 is shown in a mounted position on a head 241 for which the device 250 is appropriately sized. In so far as the left earphone 270 and the right earphone 280 are substantially mirror images of each other, in the interest of brevity, only the left earphone 270 will be described in detail. In the right side of FIG. 2B elements corresponding to elements in the left side of FIG. 2B are labeled with reference numerals that differ from the reference numerals of the corresponding left side elements by the replacement of number 7 in the second digit of each reference numeral by number 8. Referring to the left side of FIG. 2B, the left earphone includes a left woofer component 272 including a sound outlet 272a, a left tweeter component 274 including sound outlet 274a. An extending arm 278 supports the tweeter component 274 at a position such that the sound outlet 274a of the tweeter 274 is preferably spaced from the sound outlet 272a of the woofer 272 between ½ and 6 centimeters and more preferably spaced between 2 and 6 centimeters. As shown the tweeter sound outlet 274a is positioned closer to the front of the user's head compared to the woofer sound outlet 272a. When the device 250 is correctly mounted on a user's head or an IEC 60318-7 for audio dummy testing head (for which the device 250 is appropriately sized, as the device 250 may be sold in multiple sizes to fit different size heads) the sound outlet 272a of the woofer component 272 is preferably within 1.5 centimeters and more preferably within 1.2 centimeters of the center of the opening of the ear canal and the sound outlet 274a of the tweeter component 274 will be spaced between ½ and 7.5 centimeters from the center of the opening of the ear canal. However preferably the tweeter sound outlet 274a is within 6 centimeters of the user's ear canal. Placing the tweeter sound outlet 274a at at least ½ centimeter away from the user's ear canal, helps to increase the realism of audio spatialization of the sound. The tweeter sound outlet 274a is preferably spaced from the user's ear canal towards the front of the user's head. The realism increases to a significant perceptible degree as the distance of the tweeter sound outlet 274a to the user's ear canal is further increased to 4 centimeters and increases a further perceptible degree as the aforementioned distance is increased to 6 centimeters, however does not typically increase perceptibly as the distance is increased beyond 6 centimeters. Such realism for virtual sounds is highly beneficial for augmented reality and mixed reality applications which are described further hereinbelow). There is however a certain tradeoff in that increasing the distance between the tweeter sound outlet 274a and the user's ear canal requires the volume of audio emitted by the tweeter to be increased which would increase the distance within which nearby persons would hear sounds thereby potentially compromising the user's privacy and creating an annoyance to such nearby persons. Thus according to certain embodiments it would be desirable to place the tweeter sound outlet 274a within 4 centimeters of the ear canal when the device 250 is correctly mounted on a user's head or an IEC 60318-7 for audio dummy testing head (for which the device 250 is appropriately sized, as the device 250 may be sold in multiple sizes to fit different size heads). The external audio source 102 which may not be part of the device 250 provides a stereo audio signal (254, 256) as input. Since significant aspects of device 250 are substantially similar to device 150 in FIG. 1B, the redundant explanations are not repeated. An aspect of device 250 that is not substantially similar to device 150 is the form factor of the mounting attachment 290.

Unlike in the left and right earphones of FIG. 1B, which each had their own ear-clip mounting attachment 176, 186, the left and right earphones 270, 280 in FIG. 2B do not have an ear-clip mounting attachment as part of the earphone 270, 280. Rather, there is an overall head-spanning mounting attachment 290 that goes over the head, reaching down to the left and right earphones 270, 280 on each side. A left side 290a of the mounting attachment 290 can be seen on the left side of FIG. 2B, and a right side 290b of the mounting attachment 290 can be seen on the right side. Aside from this difference in the mounting attachment, and the fact that the woofer 272, 282 and tweeter 274, 284 components are mounted on this head-spanning attachment 290 and not on ear-clips, the rest of FIG. 2B (including the placement of the woofer components 272, 282 and tweeter components 274, 284, and the mounting attachment extensions 278 and 288) is substantially similar to what is shown in FIG. 1B and described above.

Figure 11A:
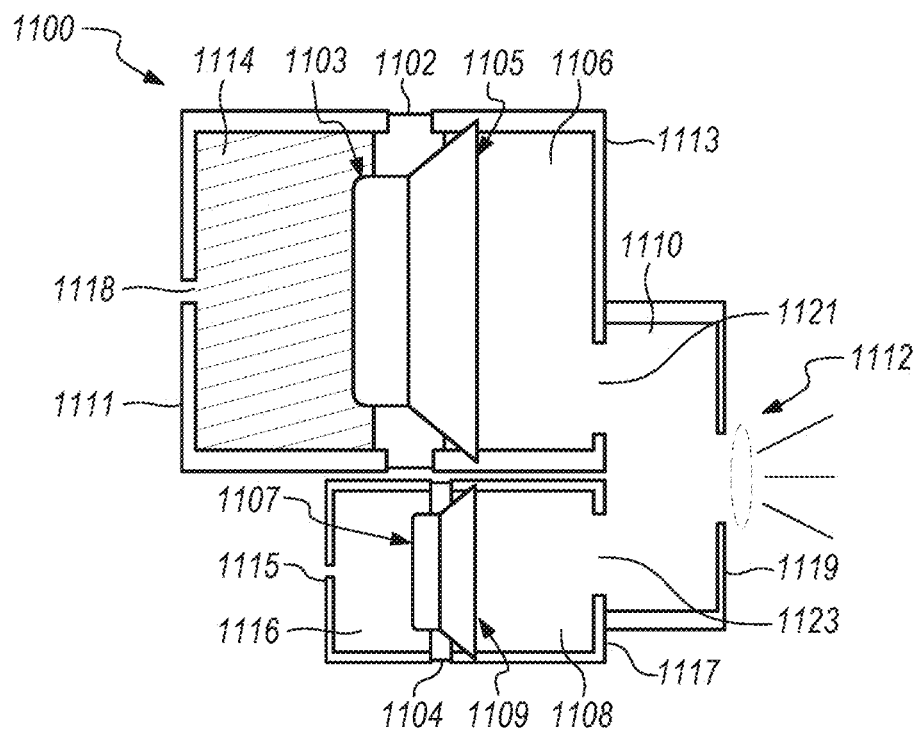
FIG. 11A is a cross sectional view of a first integrated woofer and tweeter component that may be used as an alternative to the woofer and tweeter components used in the sound reproduction apparatuses shown in FIGS. 1A, 2A and 9A.
Figure 11B:
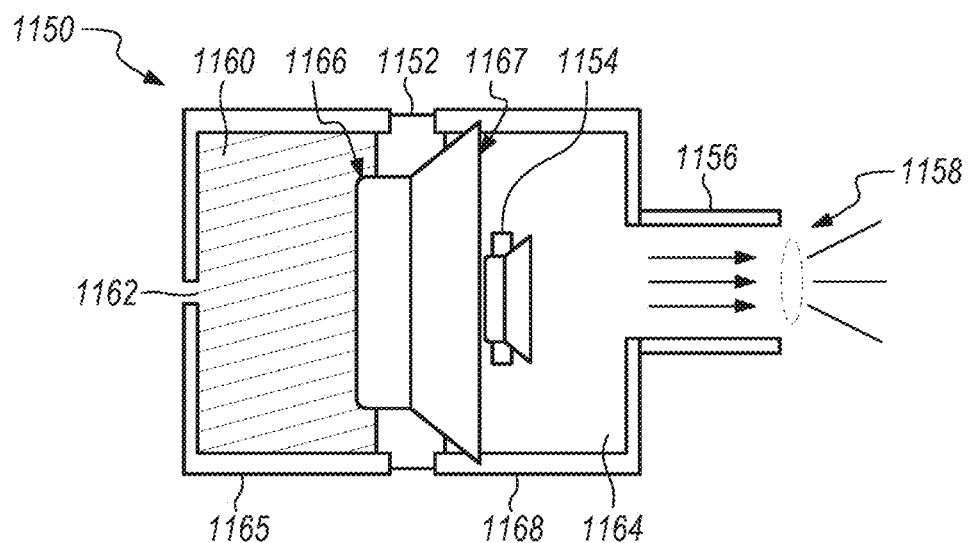
FIG. 11B is a cross sectional view of a second integrated woofer and tweeter component that may be used as an alternative to the woofer and tweeter components used in the sound reproduction apparatuses shown in FIGS. 1A, 2A and 9A.

FIGS. 3A, 3B, 3C, 3D and 4A, 4B, 4C, 4D show different design options for implementing the woofer components and tweeter components included in the head-worn sound reproduction devices described herein. The depicted design options are not meant to be limiting, but rather to show a few approaches for how woofer and tweeter components may be implemented, using elements such as dynamic drivers, back volumes, front volumes, tunnels and funnels, and reflectors and diffusers. Other approaches and designs may also be effective for implementing the woofer and tweeter components of the present device. For example, it is possible to take separate sound outlets from a woofer component and tweeter component, and merge them into a shared chamber or sound tunnel which has a single sound outlet. In such a case of a shared sound outlet, the woofer and tweeter sound outlets would be considered to be co-located at the position of the shared sound outlet. Examples of co-located woofer and tweeter sound outlets are shown in FIGS. 11A and 11B.

In the following discussion, the speaker designs are for the most part "woofer-tweeter agnostic", meaning that any given design (with appropriate choices for size, weight, shape, etc) can be used to implement either a woofer component or a tweeter component (with some exceptions noted). Therefore the term "speaker component" in the following discussion is used as a generic term meaning either a woofer component or tweeter component. In each of the examples below, the speaker driver element of the speaker component is illustrated as a type of driver commonly called a dynamic driver. However other kinds of speaker drivers may also be used, such as piezoelectric drivers, balanced armature drivers, etc. The use of dynamic drivers in the following figures is exemplary only, and not intended to be limiting.

Figure 3A:
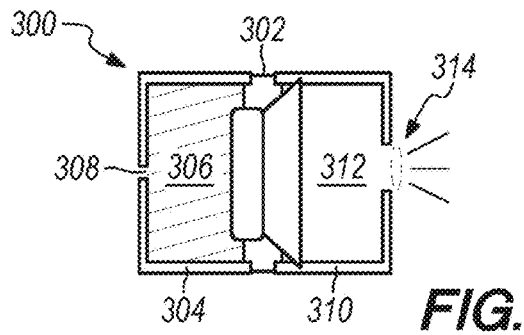
FIGS. 3A-3D show enclosed-driver designs for a woofer component and a tweeter component that may be used in the head-worn sound reproduction apparatuses shown in FIGS. 1A, 1B, 2A, 2B, 9A, 9B, including with and without a back volume, and with and without a sound-directing tunnel.

FIG. 3A depicts a top-down cross section of speaker component 300 including a speaker driver 302, a back enclosure 304, and a front enclosure 310. The back enclosure 304 encloses air to create a 'back volume' or chamber 306, which is used to improve the performance of sound reproduction hardware. The back enclosure 304 has one or more ports 308, which are openings that allow some movement of air. The front enclosure 310 also encloses air to create a 'front volume' or chamber 312. However in this case the sound is further channeled (e.g., toward the user's ear canal openings) via a sound outlet 314, shown as an opening in the surface of the front enclosure 310.

Figure 3B:
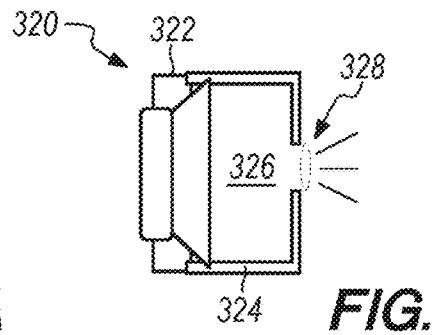

FIG. 3B depicts a top-down cross section of a speaker component 320 which is substantially similar to speaker component 300 of FIG. 3A, except that the back enclosure 304 seen in FIG. 3A is omitted in the speaker component 320 of FIG. 3B.

Figure 3C:
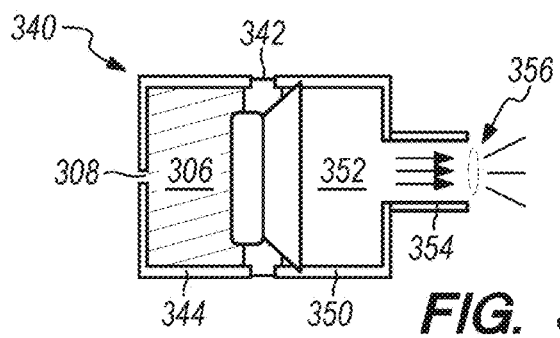

FIG. 3C depicts a top-down cross section of a speaker component 340 including a speaker driver 342, a back enclosure 344, a front enclosure 350, and an acoustic tunnel 354. The back enclosure 344 of FIG. 3C is substantially similar to the back enclosure 304 of FIG. 3A. The front enclosure 350 is largely similar to the front enclosure 310 of FIG. 3A, except that where the latter had an opening forming a sound outlet 314, the former connects to a sound tunnel 354 at the end of which is an opening forming a sound outlet 356. The front enclosure 350 encloses a front volume 352. While the sound tunnel 354 in the diagram is illustrated as being centered to the speaker driver and having an equal width along all of its length, in other cases the specific taper or shape of the sound tunnel can vary significantly, as many different forms and shapes of sound tunnels can be effective for channeling sound.

Figure 3D:
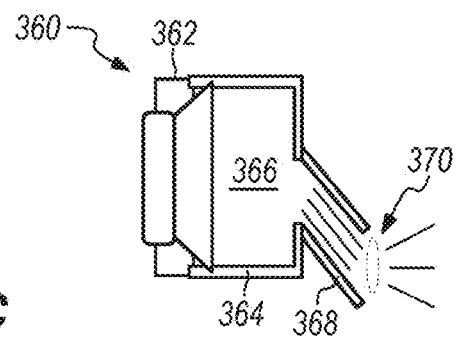

FIG. 3D depicts a top-down cross section of a speaker component 360 which is similar to speaker component 340 of FIG. 3C, except that the back enclosure 344 seen in FIG. 3C is omitted in the speaker component 360 of FIG. 3D. The speaker component 360 includes a driver 362 facing into a front enclosure 364. A sound tunnel 368 is offset with respect to a common axis of the driver 362, 364 and extending at an angle to the aforementioned common axis. Alternatively the sound tunnel 368 can also be tapered. Different forms and shapes of sound tunnels can be effective for channeling sound out of the front enclosure 364.

Figure 4A:
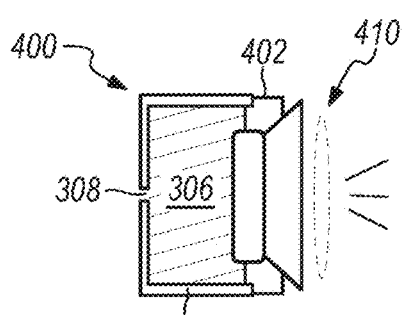
FIGS. 4A-4D show direct-radiating-driver designs for a woofer component and a tweeter component that may be used in the head-worn sound reproduction apparatuses shown in FIGS. 1A, 1B, 2A, 2B, 9A, 9B, including designs with and without a back volume, and with and without a sound-reflecting surface or sound-softening diffuser.

FIG. 4A depicts a top-down cross section of a speaker component 400 including a direct-radiating speaker driver 402, and a back enclosure 404. The back enclosure 404 of FIG. 4A is substantially similar to the back enclosure 304 of FIG. 3A. The direct-radiating speaker driver 402 disperses sound directly into the air (notwithstanding any "acoustically transparent" material that may cover the speaker for protection or cosmetics) from the surface of the diaphragm. As such, a direct-radiating driver can be said to have a sound outlet 410 that is approximately coextensive with the circumference of the surface of the diaphragm.

Figure 4B:
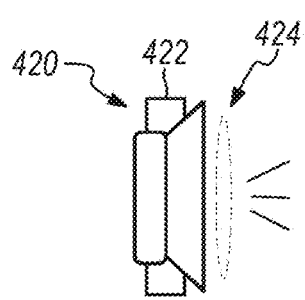

FIG. 4B depicts a top-down cross section of a speaker component 420 which is substantially similar to speaker component 400 of FIG. 4A, except that the back enclosure 404 seen in FIG. 4A is omitted in the speaker component 420 of FIG. 4B. This configuration is not recommended for the woofer component.

Figure 4C:
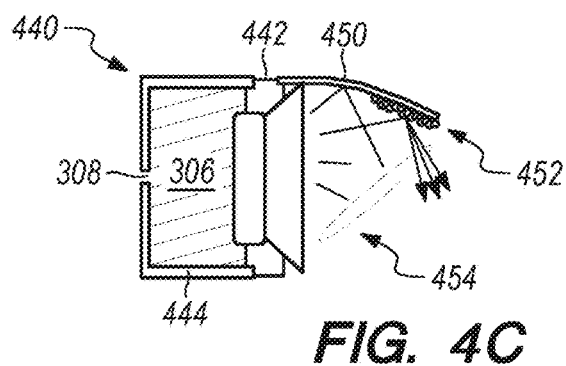

FIG. 4C depicts a top-down cross section of a speaker component 440 including a direct-radiating speaker driver 442, a back enclosure 444, a sound-reflecting surface 450, and a sound-softening diffusor 452. The back enclosure 444 of FIG. 4C is substantially similar to the back enclosure 304 of FIG. 3A. In this example, the sound-reflecting surface 450 is shown in cross section like the rest of the elements, so it cannot be clearly seen that it is "cupping" the sound to go in a particular direction (as would be readily apparent if FIG. 4C were drawn in three dimensions). The sound outlet 454 for the speaker component 440 is located in a position that reflects this "cupping"; it is located where the speaker driver 442 and the attached sound-reflecting surface 450 would form a kind of "opening" if viewed in three dimensions. In addition, a portion of the sound-reflecting surface 450 is used to mount an optional sound-softening diffusor 452, which somewhat randomizes the directionality of the outputted sound waves (to make them sound less "brittle" and more "diffuse").

Figure 4D:
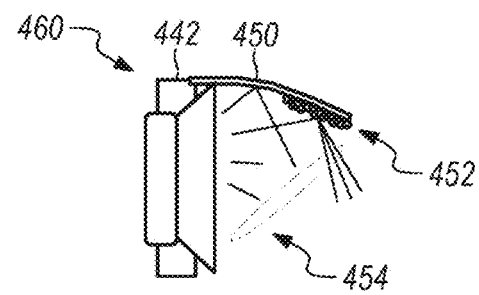

FIG. 4D depicts a top-down cross section of a speaker component 460 which is substantially similar to speaker component 440 of FIG. 4C, except that the back enclosure 444 seen in FIG. 4C is omitted in the speaker component 460 of FIG. 4D. This configuration is not recommended for the woofer component.

Figure 5A:
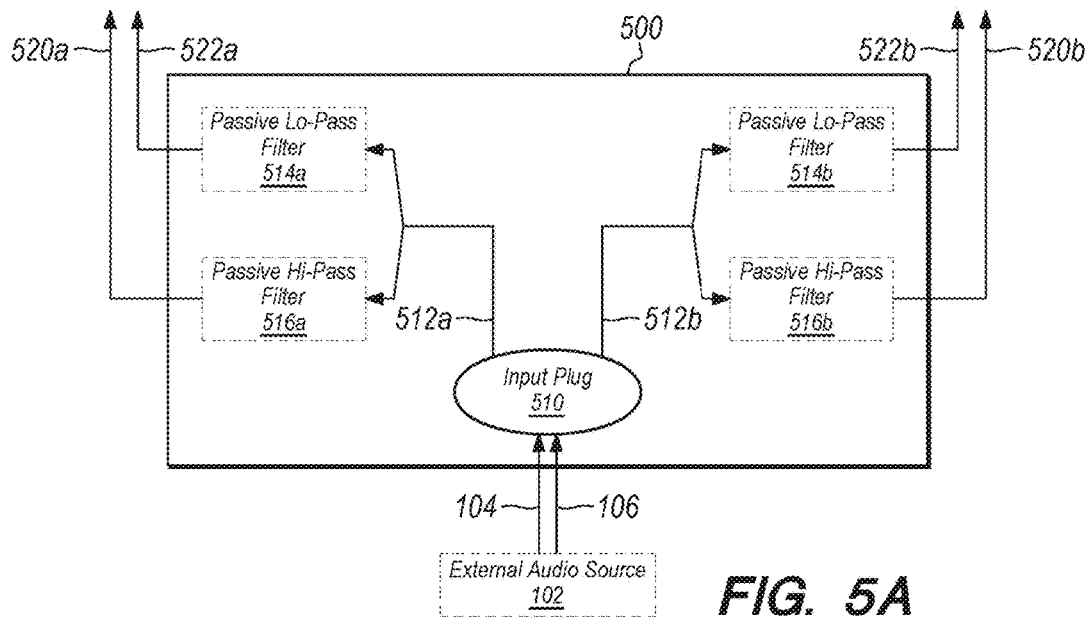
FIGS. 5A-5C show different configurations of input circuitry for passive operation, active operation, and active bi-amplified operation that may be included in or used with the head-worn sound reproduction apparatuses shown in FIGS. 1A, 1B, 2A, 2B, 9A, 9B.

FIG. 5A is a schematic diagram showing the internal implementation of an input circuitry block 500 that could be used to implement any of the input circuitry blocks 110, 160, 210, 260 shown in FIGS. 1A-2B. The input circuitry block 500 is a "passive" input circuitry block, meaning that it does not have its own source of electrical power, but rather depends on receiving an audio signal that is "speaker level" (i.e., strong enough to drive speaker drivers).

As previously seen in FIGS. 1A-2B, the external audio source 102 provides a stereo audio signal via a left channel signal conduit 104 and a right channel audio signal conduit 106 to input circuitry block 500, where the signal is received by an input plug 510 (which could be any kind of connector, a typical form being a standard 3.5 mm plug or ¼ inch plug). From the input plug 510, audio signal conduit 512a conveys the left channel of the audio signal to both a left tweeter audio signal conduit 520a and a left woofer audio signal conduit 522a.

On the way from the audio signal conduit 512a to the left tweeter audio signal conduits 520a the audio signal may optionally pass through a passive a passive high-pass filter 516a. Similarly, an optional passive low-pass filter 514a can be interposed between the left audio signal conduit 512a and the left woofer audio signal conduit 522a. The passive low-pass filter 514a removes high frequencies from the audio signal to make the operation of the woofer component more effective. The passive high-pass filter 516a removes low frequencies from the audio signal to make the operation of the tweeter component more effective. The implementation on the right side of input circuitry block 500 (involving elements 512b, 514b, 516b, 520b, 522b) is substantially similar to that of the left side. Right side elements that correspond in function to counterparts on the left side have a suffix letter b in their reference numeral in lieu of suffix a in their reference numeral.

Figure 5B:
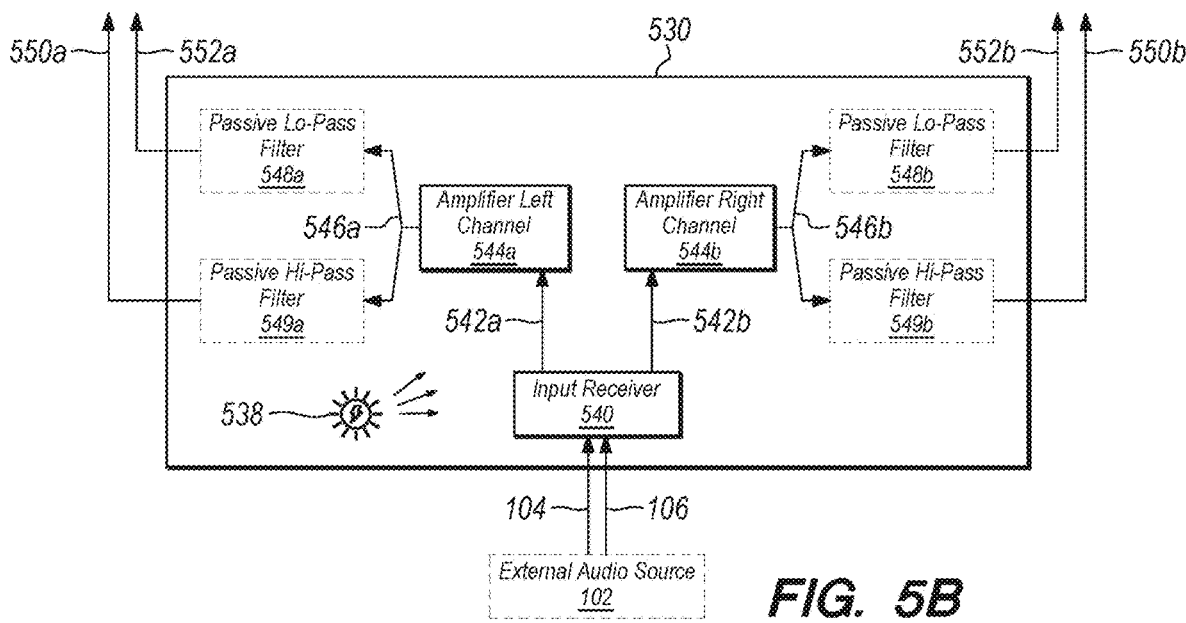

FIG. 5B is a schematic diagram showing the internal implementation of an input circuitry block 530 that could be used to implement any of the input circuitry blocks 110, 160, 210, 260 shown in FIGS. 1A-2B. In the interest of brevity the following description of the input circuitry will focus on left side components, it being understood that there are corresponding right side components that substantially mirror the left side components in structure and function. Corresponding left and right side components are labeled with reference numeral that differ only in that the left side reference numeral have a letter 'a' suffix and the right side components have a letter 'b' suffix. The input circuitry 530 includes an input receiver 540 which is coupled to a left channel amplifier 544-a through a left channel signal conduit 542-a and is coupled to a right channel amplifier 544-b through a right channel signal pathway 542-b. A left channel amplifier 544-a output signal bus 546-a is coupled to an optional passive lo-pass filter 548-a and a passive hi-pass filter 549-a. The passive lo-pass filter 548 outputs to a left woofer audio signal conduit 522a and the passive hi-pass filter 516-a outputs to a left tweeter audio signal conduit 520-a.

The input circuitry block 530 is an "active" input circuitry block, meaning that it has a source of electrical power 538 (which can either be internal, like a rechargeable battery, or external from some other device). In the input circuitry 530 the electrical power 538 feeds active elements that consume power, which would include, at least, the left channel amplifier 544a and the right channel amplifier 544b, and possibly the input receiver block 540.

In FIG. 5B, as previously seen in FIGS. 1A-2B, the external audio source 102 provides stereo audio signal via a left channel audio signal conduit 104 and a right channel audio signal conduit 106 to input circuitry block 530, where the signal is received by the input receiver block 540. In an active system, the input receiver block 540 could be implemented in a passive way, in a manner similar to the input plug 510 of FIG. 5A. More typically in an active system, the input receiver 540 would receive power from the source of electrical power 538, so that it can be internally implemented as shown in subsequent figures. From the input receiver 540, audio signal conduit 542a conveys the left channel of the audio signal to the left amplifier channel 544a. From there, audio conduit 546a conveys the left channel of the audio signal to both the left tweeter audio conduit 550a and the left woofer audio conduit 552a.

On the way from the audio signal conduit 542a to the output audio conduits 550a and 552a, the audio signal may optionally pass through a passive low-pass filter 548a on the way to the left woofer audio conduit 552a, and a passive high-pass filter 549a on the way to the left tweeter audio conduit 550a. The implementation of these filters (548a, 549a) is substantially similar to the filters shown in FIG. 5A (514a, 516a).

Figure 5C:
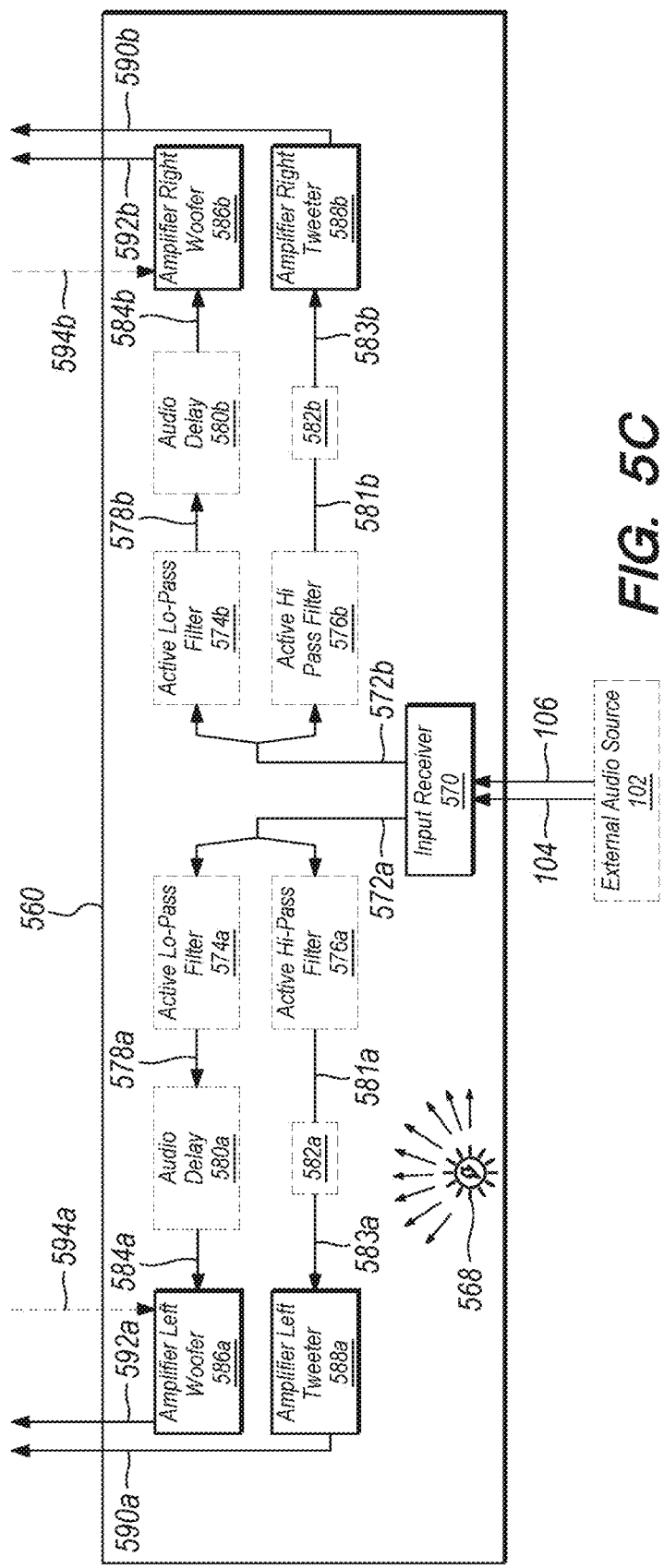

FIG. 5C is a schematic diagram showing the internal implementation of an input circuitry block 560 that could be used to implement any of the input circuitry blocks 110, 160, 210, 260 shown in FIGS. 1A-2B. In the interest of brevity the following description of the input circuitry 560 will focus on left side components, it being understood that there are corresponding right side components that substantially mirror the left side components in structure and function. Corresponding left and right side components are labeled with reference numeral that differ only in that the left side reference numeral have a letter 'a' suffix and the right side components have a letter 'b' suffix. The input circuitry block 560 is an "active bi-amplified" input circuitry block, meaning that it has a source of electrical power 568 (which can either be internal, like a rechargeable battery, or external from some other device). In FIG. 5C, the electrical power 568 feeds power consuming elements, which in this active bi-amp configuration can include all of the other electronic components within input circuitry block 560.

The benefit of using the active bi-amp configuration is that it not only produces better results more reliably (since the amplifiers are selected to match the speakers), but it can also perform more precise "signal processing" of the respective woofer and tweeter signals, because in a "bi-amplified" scenario they are split apart and processed "before" the amplifiers while still in the "digital domain". This improved processing can often yield improved audio quality. Note that while the specific ordering (i.e. which comes after which in the "signal chain") of the components shown in FIG. 5C represents one effective option, other orderings might be equally or even more effective for particular purposes.

In FIG. 5C, as previously seen in FIGS. 1A-2B, an external audio source 102 provides a stereo audio signal via a left channel audio signal conduit 104, and a right channel audio signal conduit 106 to the input circuitry block 560, where the signal is received by an input receiver 570. In an active bi-amp configuration such as that of input circuitry 560, the input receiver 570 is typically implemented as shown in subsequent FIGS. 6A-6C. From the input receiver 570, a left audio signal conduit 572a conveys the left channel of the audio signal to both a left woofer amplifier 586a and a left tweeter amplifier 588a. From there, the output of the left woofer amplifier 586a drives (directly or indirectly) an audio signal conduit 592a going to the left woofer, and the output of the left tweeter amplifier 588a drives (directly or indirectly) an audio signal conduit 590a going to the left tweeter.

On the way from the audio signal conduit 572a to the respective inputs of the left woofer amplifier 586a and the left tweeter amplifier 588a, an audio signal may optionally pass through an active low-pass filter 574a on the way to the left woofer amplifier 586a, and may optionally pass through an active high-pass filter 576a on the way to the left tweeter amplifier 588a. The implementation of the active low pass filter 574a and the active high pass filter 576a is not likely to be the same as those seen in earlier figures because in FIG. 5C the filters are not passive but active, i.e. powered by the electrical power 568 and implemented in the digital domain as digital signal processing (DSP) algorithms. Regardless of their implementation, a main goal of including the optional filters 514, 516, 548, 549, 574, 576 shown in FIGS. 5A-5C is to apply filter response curves to make the woofer and tweeter more effective; some exemplary filter response curves are shown in later figures.

Also on the way from the audio signal conduit 572a to the input of the left woofer amplifier 586a, the audio signal may optionally pass through an audio delay block 580a, which delays the woofer signal in time. This delay is useful for configurations where the tweeter component is significantly further (i.e. up to a few centimeters further) from the opening of the user's ear canal than the woofer component. In such cases, given the propagation speed of sound in air (~335 meters per second), the difference in distance can be large enough that sound waves from the woofer reach the ear noticeably sooner than the corresponding sound waves from the tweeter. The resulting mix, which may be referred to as "unaligned" or "out of phase", can sound "mushy" to the average listener. The purpose of the audio delay 580a is to compensate for this difference in arrival time, so that the now delayed woofer sounds reach the ear canal at the same time (as closely as possible) as the corresponding tweeter sounds, and the sound remains crisp and pure.

Lastly, a further optional optimization depicted in FIG. 5C is the use of 'smart' amplification for two of the four channels (the two woofer amplifiers 586a and 586b). In 'smart' amplification, an amplifier channel monitors aspects of the speaker driver that it is driving, such as its excursion (i.e. position within its range), temperature, etc., so that the amplifier can drive the driver right up to the limits of its performance (but never beyond, since that causes audible distortion). Left woofer amplifier 586a receives speaker monitoring signal conduit 594a, indicating that this amplifier channel is a 'smart' amplifier monitoring its attached speaker driver. Likewise, the right woofer amplifier 586b receives speaker monitoring signal conduit 594b.

Figure 6A:
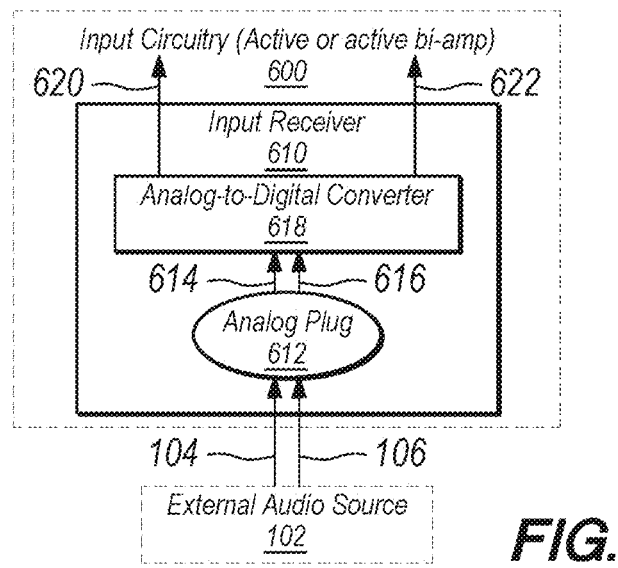
FIGS. 6A-6C show different configurations of an input receiver portion of input circuitry shown in FIGS. 5B and 5C for analog input, USB input, and wireless input.

FIG. 6A is a schematic diagram showing an input circuitry block 600 including an input receiver block 610 that could be used to implement either of the input receiver blocks 540, 570 of FIGS. 5B-5C. The input receiver 610 is an "active" block, meaning that it draws electrical power to run its components, in this case from an electrical source such as source 538 of FIG. 5B or source 568 of FIG. 5C. The external audio source 102 provides a stereo audio signal via the left channel audio signal conduit 104 and the right channel audio signal conduit 106 to input circuitry block 600, where the signal is received by the input receiver 610, and more specifically by the analog plug 612 (which could be any kind of connector, a typical form being a standard 3.5 mm plug or ¼ inch plug). From the analog plug 612, a left audio signal conduit 614 and a right audio signal conduit 616 convey the left and right audio signals to a digital-to-analog converter 618, which converts the analog audio signals into digital audio signals. From there, the left and right audio signals are propagated out to the rest of the input circuitry 600 via a left digital output audio signal conduit 620 and a right digital output audio signal conduit 622.

Figure 6B:
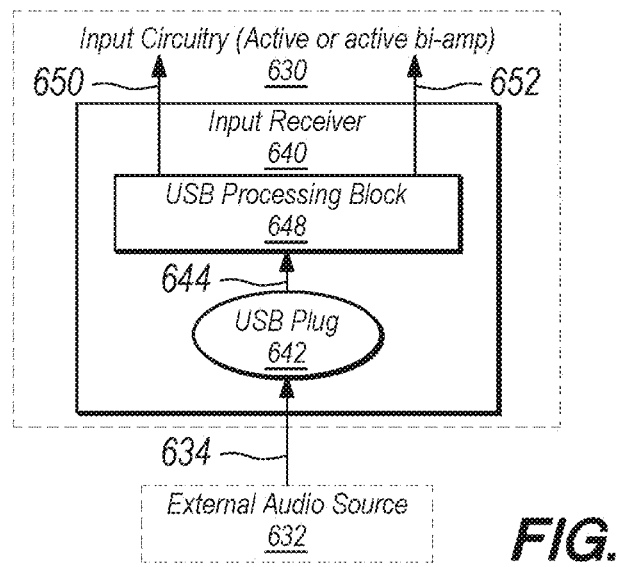

FIG. 6B is a schematic diagram showing an input circuitry block 630 including an input receiver block 640 that could be used to implement either of the input receiver blocks 540, 570 of FIGS. 5B-5C. The input receiver 640 is an "active" block, meaning that it draws electrical power to run its components, in this case from an electrical source such as source 538 of FIG. 5B or source 568 of FIG. 5C. The input receiver 640 implements a Universal Seral Bus (USB) interface and includes a USB plug 642 and a USB processing block 648. An external audio source 632 provides a digital stereo audio signal 634 via USB plug 642 to USB processing block 648. The USB interface could conform to one of a number of USB variants including the latest USB-C. From the USB plug 642, an audio digital signal that encodes left and right audio channels is coupled via a digital signal conduit 644 to the USB processing block 648. The USB processing block 648 can include an audio decoder. The USB processing block 648 generates left channel and right channel audio signals which are output to the remaining portions of the input circuitry 630 via, respectively a left audio signal output 650 and a right audio signal output 652.

Figure 6C:
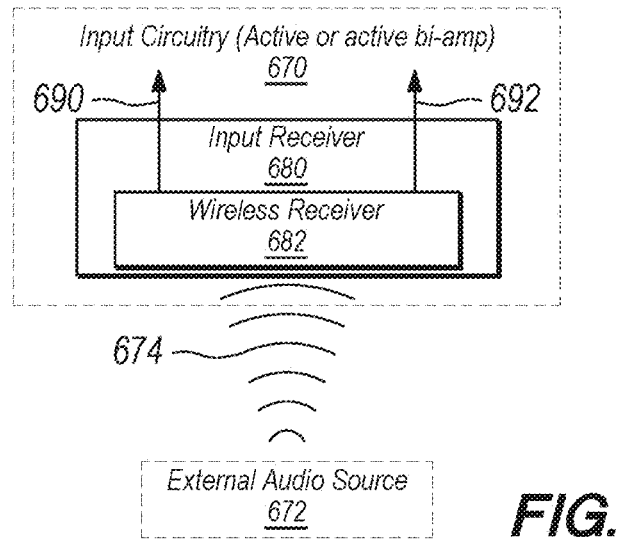

FIG. 6C is a schematic diagram showing an input circuitry block 670 including an input receiver block 680 that could be used to implement either of the input receiver blocks 540, 570 of FIGS. 5B-5C. The input receiver 680 is an "active" block, meaning that it draws electrical power to run its components, in this case from an electrical source such as source 538 of FIG. 5B or source 568 of FIG. 5C. An external audio source 672 provides a stereo audio signal via signal conduit 674 (in this case a wireless channel) to input circuitry block 670, where the signal is received by the input receiver 680, and more specifically by the wireless receiver block 682 (which could be any kind of wireless receiver, a typical form being a Bluetooth chip or NFMI chip). From wireless receiver 682, the left and right audio signals are propagated out from input receiver 680 to the rest of the input circuitry 670 via the audio conduits 690 and 692.

Figure 7A:
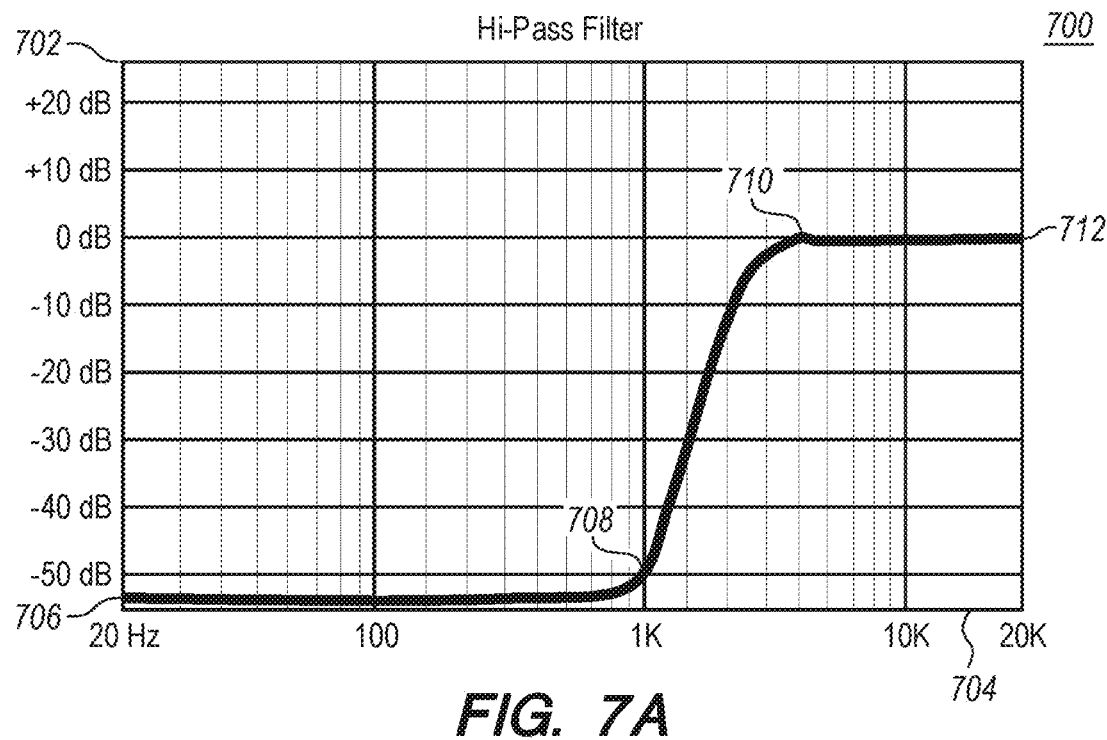
FIGS. 7A-7B show examples of appropriate and beneficial frequency response curves for a high-pass filter and a low-pass filter portions of the input circuitry shown in FIGS. 5A, 5B, 5C.

FIG. 7A shows a frequency response chart 700 with a frequency response curve 706-712 that can be effective as a high-pass filter applied to an audio signals used to drive a tweeter component, as is done by the optional high-pass filter blocks 516a, 516b, 549a, 549b, 576a, 576b shown in FIGS. 5A-5C. The frequency response curve 706-712 is shown over a chart background with a vertical axis 702 indicating relative volume level in decibels and ranging from +20 decibels to −50 decibels, and a horizontal axis 704 indicating frequency in hertz and ranging from 20 Hz to 20 KHz. From this chart 700, the behavior of the high-pass filter can be readily seen: frequencies below 1 KHz 706-708 are attenuated by over 50 decibels; then there is a gradual increase in volume for frequencies from 1.0 KHz to 1.4 KHz 708-710, and frequencies above 1.4 KHz 710-712 are allowed to pass unaffected. This frequency curve, or others with a similar overall approach, can be an effective tool for helping the tweeter component perform effectively and optimally within the device.

Figure 7B:
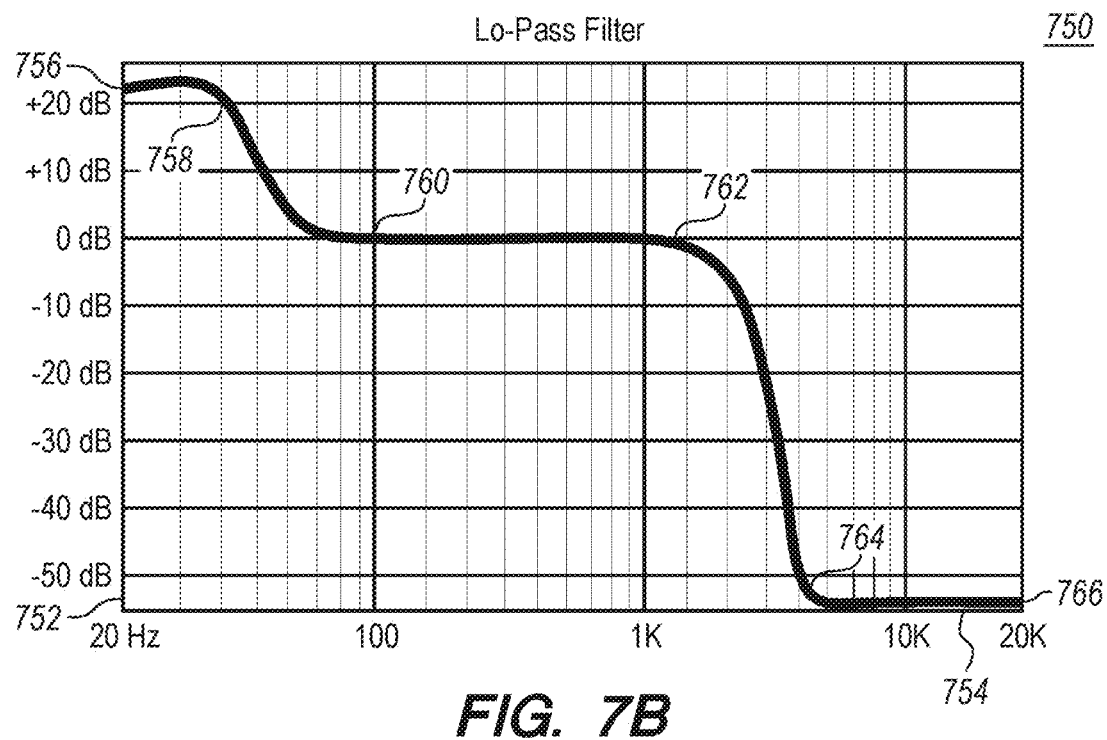

FIG. 7B shows a frequency response chart 750 with a frequency response curve 756-766 that can be effective as a low-pass filter applied for an audio signal going to a woofer component, as is done by the optional low-pass filter blocks 514a, 514b, 548a, 548b, 574a, 574b shown in FIGS. 5A-5C. The chart 750 has a vertical axis 752 indicating relative signal level ranging from +20 decibels to −50 decibels, and a horizontal axis 754 indicating frequency ranging from 20 Hz to 20 KHz. From this chart 750, the behavior of the low-pass filter can be readily seen: it begins with a significant bulge 758 in the low bass region to boost the bass performance of the woofer component by up to more than 20 decibels. The respond curve 756-766 slopes down to no boost or cut at 100 Hz 760. From 100 Hz to 1 Khz 760-762 the frequencies are without boost or cut. Then there is a gradual decrease in volume for frequencies from 1.0 KHz to 1.4 Hz 762-764, and the frequencies above 1.4 KHz have an attenuation of more than −50 dB 764-766. This frequency curve 756-766, or others with a similar overall approach, can be an effective tool for helping the woofer component perform effectively and optimally within the device.

The low pass filters 514a, 514b, 548a, 548b, 574a, 574b and the high pass filters 516a, 516b, 549a, 549b, 576a, 576b work in low-high pairs that together form a crossover filter.

Per the frequency responses indicated in the FIGS. 7A-7B the crossover frequency is about 1250 Hz. More generally, the crossover filter can be appropriately chosen based on the frequency responses of the woofer components and tweeter components. Per FIG. 7B a limited subrange of frequencies 756-758 extending from about 20 Hz to a frequency (e.g., 60 Hz) substantially below the crossover frequency is given a higher gain compared to other frequencies in the range below the crossover frequency. More generally at least some frequency components (bands) below 100 Hz are amplified substantially more (e.g., at least 10 dB more) compared to other frequency components (bands) below the crossover frequency. This aids in providing a strong low end bass component (e.g., for sounds emanating from virtual objects) notwithstanding the fact that the woofer sound outlets described herein are intentionally not designed to be sealing engaged in users' ear canals so as not to impede the hearing of ambient sounds (e.g. from real world sound sources).

Figure 8A:
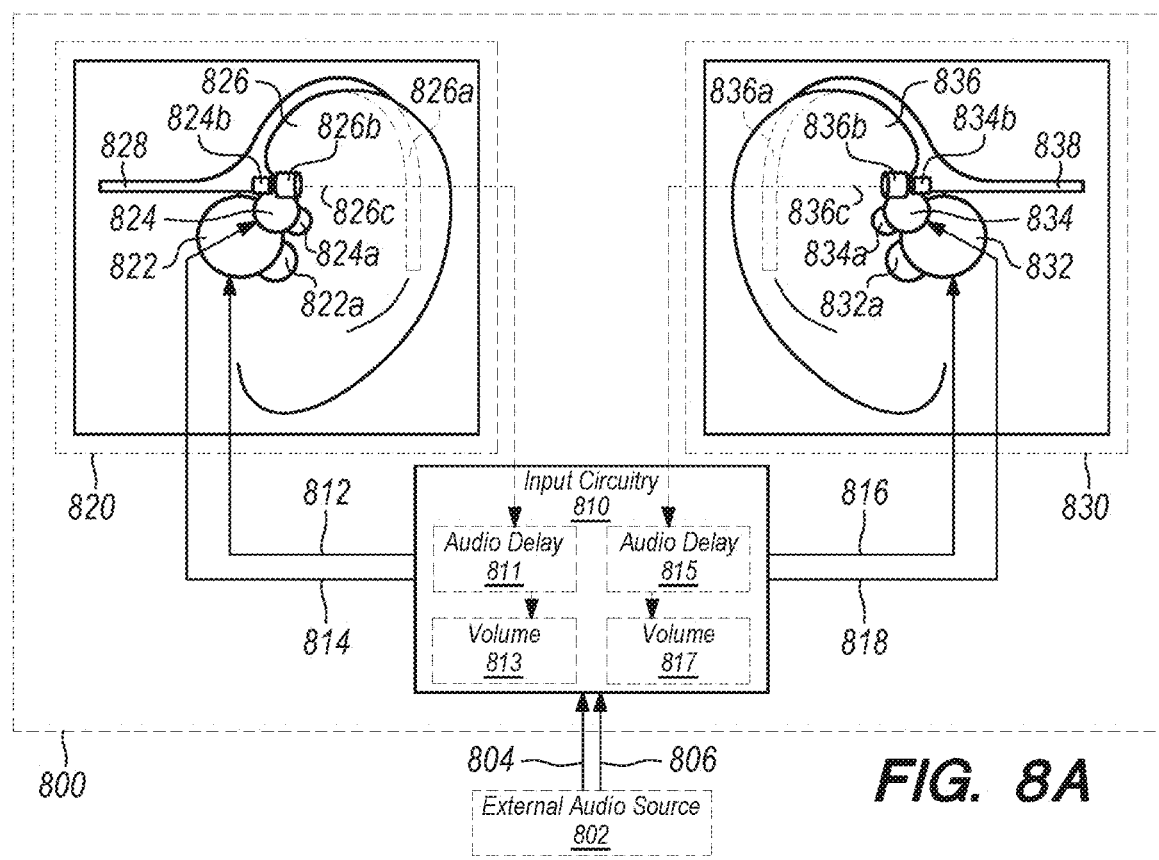
FIGS. 8A-8B show a head-worn (head-wearable) sound reproduction device with mounting attachments that include user adjustable positioning of the tweeter component over a range of distances from the ear canal.
Figure 8B:
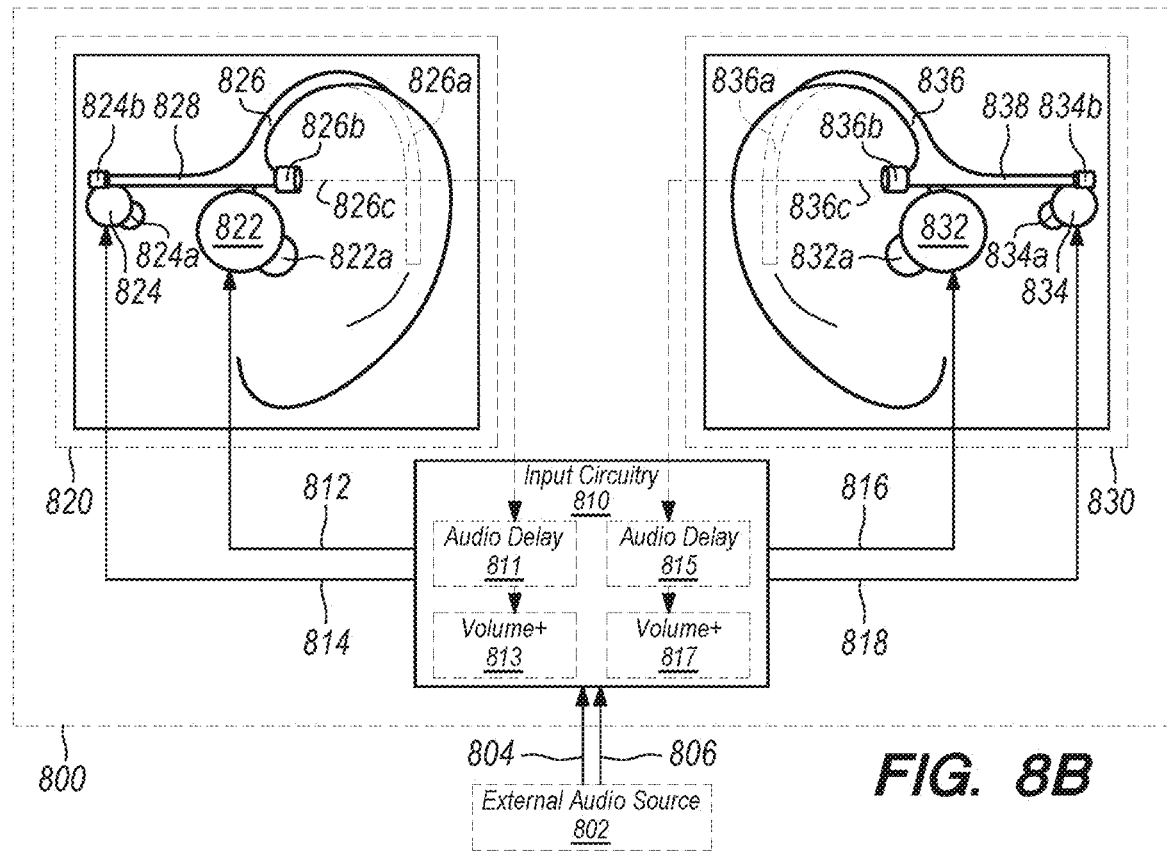

FIGS. 8A-8B shows a head-worn sound reproduction device 800 including an input circuitry block 810, a left earphone 820, a right earphone 830, and audio signal conduits 812, 814, 816, 818. In addition, an external audio source 802 which is not part of the device provides a stereo audio signal (804, 806) as input. The external audio source 802 is coupled via a left audio signal conduit 804 and a right audio signal conduit 806 to the input circuitry 810. In the interest of brevity the a description will be given with reference mainly to the left earphone 820, it being understood that the right earphone 830 has a structure and function that substantially mirrors the left earphone. Reference numerals of the elements of the right earphone 830 differ from the reference numerals of the elements of the left earphone by the substitution of a number 3 in lieu of a number 2 in the second digit. A left woofer signal conduit 812 couples the input circuitry 810 to a woofer component 822. (There is a corresponding right woofer signal conduit 816) A left tweeter signal conduit 814 couples the input circuitry 810 to a left tweeter component 824. (There is a corresponding right tweeter signal conduit 818). The left woofer component 822 includes a sound outlet 822a that is positioned within 1.5 centimeter and preferably within 1.2 centimeters of a center of an opening of the ear canal when the head-worn reproduction device 800 is properly mounted on a user's head which is taken to be represented by a IEC 60318-7 audio testing dummy head for which the head-wearable device is appropriately sized (it being understood that the device may be offered in multiple sizes). The close proximity of the sound outlet 822a of the woofer component in combination with low frequency extra boost, for example represented by the portion 756-758 of the low pass filter frequency response shown in FIG. 7B, yields strong, effective bass acoustics notwithstanding the fact that the sound outlet 822a is not sealingly engaged within the ear canal (as is the case with certain earphones). Accordingly, the user can enjoy strong effective bass acoustics without impairing the user's ability to hear environmental sounds. The ability to hear both environmental sounds and sounds output through the head-worn sound reproduction device is highly beneficial for mixed or augmented reality devices.

The left tweeter component 824 is slideably engaged on a left tweeter support rail 828. The device 800 allows the user to manually change the position of the tweeter components 824 and 834. The device 800 is shown initially in FIG. 8A in a state with the tweeter components 824 and 834 located close to the user's ear canal openings. In FIG. 8B, the device 800 is shown in another state in which the tweeter components 824 and 834 have been moved further from the user's ear canal openings. Recall that in FIGS. 1A and 1B, two different devices 100, 150 were presented, each with ear-clip mounting attachments 126, 136, 176, 178, 186, 188 that held the woofer and tweeter in fixed positions: in FIG. 1A the tweeter components 124, 134 were located close to the ear canal opening, and in FIG. 1B the tweeter components 174, 184 were located further away.

In the case of device 800 shown in FIGS. 8A-8B, the user has the option of changing the tweeter positions "on the fly", by manually sliding the tweeter components (824, 834) along their respective tweeter support rails 828, 838. The length of these tweeter support rails 828 and 838 offers a range of distance options for placing the tweeter components, with the presently considered range being 0 to 4 centimeters from the ear canal opening. This allows the user to make a small physical adjustment that reflects a significant audio difference. The closer distance offers more privacy with less leakage or "bleed", but with a less than maximized "sound stage" due to the proximity to the ears of the tweeter components. The further distance offers less privacy with more leakage or "bleed", but at the same time the "sound stage" becomes expanded due to the greater distance of the tweeter components, and unlike floor or wall mounted speakers, the sound remains "pure" and free of environmental ambience. The perceptual effect from this latter combination of results is previously unknown, and not expected, but quite pleasing.

To envision more precisely the sliding tweeter components 824 and 834, and the tweeter support rails 828 and 838 that they slide on, one can envision a typical slider-in-rails construction, where the tweeter is attached to a spreading flange that sits "locked" within a partially enclosed channel provided by the tweeter support rails. The user can easily slide the tweeter component forward or backward within the channel by a light touch of the fingers. And when the tweeter reaches the near or far end of the channel, it stops and remains there until it is nudged back in the opposite direction. In this way, with a simple touch, the user can access a variety of tweeter placements, and with them a range of different kinds of listening experiences.

In an optional (but beneficial) enhancement, the device 800 further comprises a left and right sensor component 826b, 836b, and their respective sensor targets 824b, 834b. The sensor components 826b and 836b are attached to the ear-clip mounting attachments 826 and 836, and they remain fixed in place. The sensor targets 824b and 834b are mounted on the tweeter components 824, 834, and they move wherever the tweeter components 824, 834 move. The sensor components measure the distance to their respective sensor targets on an ongoing basis, and report that information back to the input circuitry block 810 via information conduits 826c and 836c. The requirement of this sensing is that it be accurate to within roughly a millimeter, or better if possible, and this can be accomplished by multiple kinds of proximity sensing devices, such as optical distance sensors that detect reflective surfaces, or capacitive sensors that target electrically conductive substances. The implementation of the sensor targets 824b and 834b follows the implementation of the sensor components 826b and 836b. A potentiometer or other type of position sensor may also be used.

Within input circuitry block 810, the left side tweeter distance is received by the processing blocks 811 and 813, and the right side tweeter distance is received by the processing blocks 815 and 817. Examining the left side only (and the right side is substantially similar), processing block 811 is an audio delay similar in role and function to the audio delay 580a in FIG. 5C. Recall that in that case an audio delay 580a can optionally be introduced into the woofer signal chain to correct for a sound-wave arrival-time differential that would otherwise occur when the tweeter is further from the ear canal than the woofer. In device 800, the 'delay time' parameter of audio delay 811 is varied according to the distance reporting from the left sensor 826b. This mapping is programmed so that the amount of time compensation is always correct, regardless of the position of the tweeter. The presently preferred 'delay time' goes from 0 microseconds when the tweeter sound outlet is co-located with the woofer sound outlet (as seen in FIG. 8A), up to around 100 microseconds when the tweeter is fully extended (as seen in FIG. 8B).

In addition to real time delay control, input circuitry 810 includes processing block 813 which is an audio volume (gain) control, a standard audio processing feature, in this case applied at a place within the tweeter signal chain that in FIG. 5C is occupied by the processing block 582a. This processing block 813 provides automatic volume (gain) adjustment based on the ongoing reporting of distance, to compensate for the tweeter moving closer or further from the ear canal. This ensures that the perceived volume of the tweeter will remain constant as it gets pushed back and forth by the user. Standard 'distance verses loudness' calculations can be used to determine the mapping between volume and speaker position. The presently preferred 'volume adjust' goes from 0 dB when the tweeter sound outlet is co-located with the woofer sound outlet (as seen in FIG. 8A), up to around 15 dB boost when the tweeter is fully extended (as seen in FIG. 8B).

With the aforementioned (optional) real time compensatory processing in the time and volume domains, the listening benefits gained from moving the tweeter into different positions can be enjoyed with no loss in audio fidelity.

Alternative mechanisms can be used in lieu of the tweeter support rails 828, 838 to allow changing of the positons of the tweeter components relative to the user's ear canal opening. For example the tweeter components could be supported on the end of a swing arm that has a pivot point on a head-spanning mounting attachment.

Figure 9A:
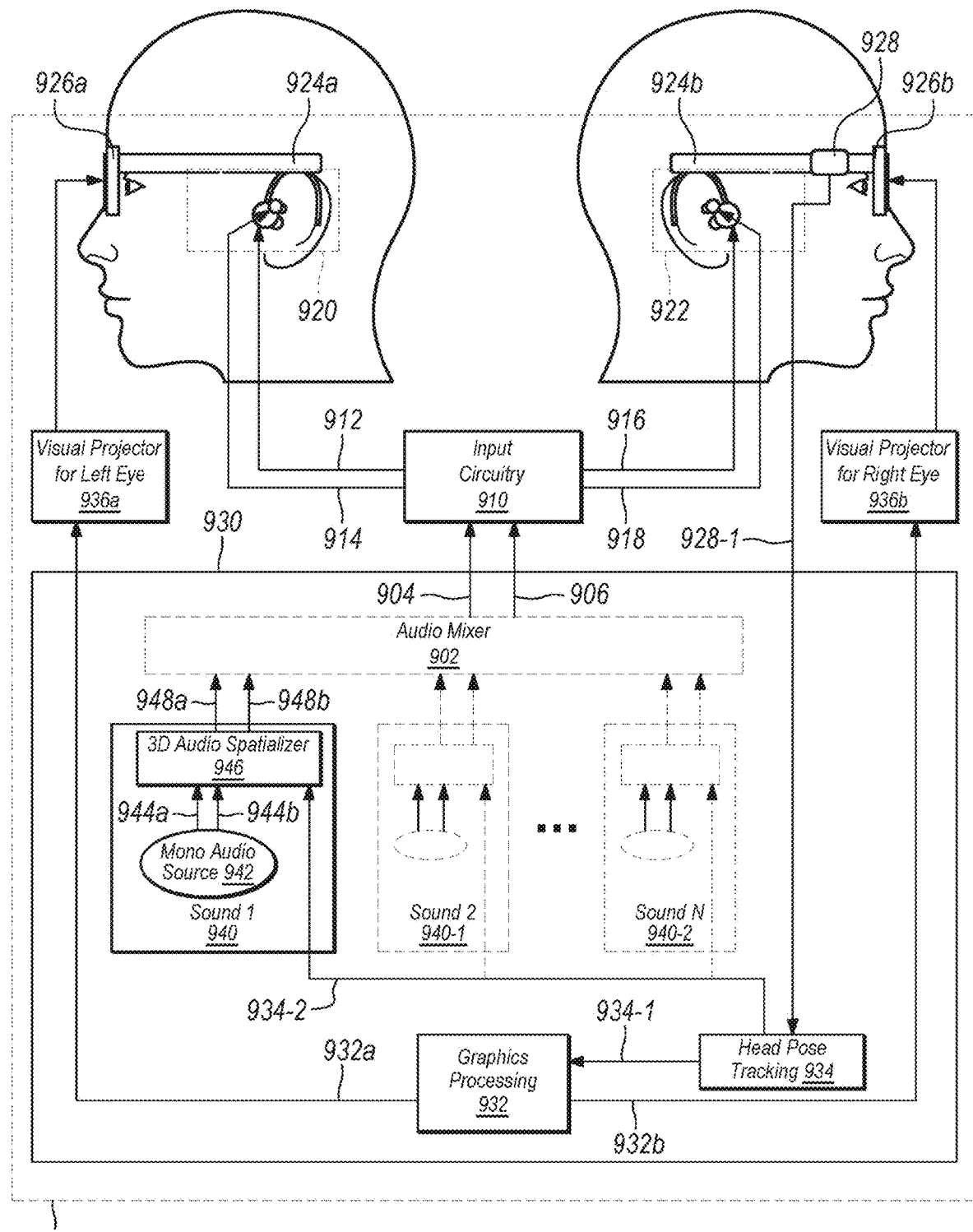
FIG. 9A shows a head-worn (head-wearable) augmented reality device that incorporates the sound reproduction device of FIG. 1A.

FIG. 9A shows a head-worn augmented reality device 900. Referring to FIG. 9A, an eyewear frame including a left portion 924-a and a right portion 924-b supports a left transparent display eyepiece 926-a and a right transparent display eyepiece 926-b. A left eye projector 936-a and a right eye projector 936-b are optically coupled to the left and right transparent display eyepieces 926-a, 926-b respectively. Each of the left and right transparent display eyepieces may for example include one or more transparent waveguide display planes. Although shown in block diagram form the left and right eye projectors 936-a, 936-b are suitably mounted on the eyewear frame 924-a, 924-b. The transparent display eyepieces 926-a, 926-b include waveguides with optical features (e.g., surface relief diffractive optical elements formed in a surface coating) for in-coupling, distributing, and out-coupling imagewise modulated light produced by the eye projectors 936-a, 936-b and directing such imagewise modulated light to the user's eyes. The in-coupling optical feature serves to deflect imagewise modulated light which is incident on each waveguide to an angle above the critical angle for total internal reflection within to each waveguide. The distributing optical features serve to redirect light to an appropriate exit point, and the outcoupling features serve to deflect the imagewise modulated light out of the plane of each light guide toward the user's eye. The left and right eye projectors 936-a, 936-b are optically coupled to the respective transparent eyepieces 926-a, 926-b by being positioned over and aimed into the in-coupling optical features. Each eyepiece 926 can include a stack of multiple waveguides for handling different color channels and including optical features that impart different field curvatures to imagewise modulated light in order to simulate different virtual object distances relative to the user. An inertial measurement unit (IMU) 928 is attached to the eyewear frame 924-a, 924-b.

A left augmented reality earphone 920 and a right augmented reality earphone 922 are provided. As shown in FIG. 9 the left and right augmented reality earphones 920, 922 conform to the design shown in FIG. 1A, however alternatively other designs in accordance with the teachings provided herein may be used in lieu of the design shown in FIG. 1A for the augmented reality device 900. Audio input circuitry 910 which can have an internal design conforming to the teachings herein above described, for example, with reference to FIGS. 5A, 5B, 5C, 6A, 6B, 6C is coupled to the left augmented reality earphone 920 via a left woofer audio signal conduit 912 and a left tweeter audio signal conduit 914; and is coupled to the right augmented reality earphone 922 via a right woofer audio signal conduit 916 and a right tweeter audio signal conduit 918. Moreover it is noted that these audio reproduction components can be enhanced and configured within the context of this augmented reality device 900, as described elsewhere in this disclosure.

A video and audio processing system 930 generates visual and audio content and drives the projectors 936-a, 936-b and the augmented reality earphones 920, 922 to output 3D virtual content which augments real world visual and audio content that is sensed by the user. The processing system 930 includes a head pose tracker 934 which receives sensor data from the inertial measurement unit 928. The inertial measurement unit 928 can include, for example, three gyroscopes that measure rate of rotation about three orthogonal axes and three accelerometers that measure gravity and acceleration along three orthogonal axes. The inertial measurement unit can be supplemented with one or more cameras and an image processing system that contributes head pose estimates by performing visual odometry. The head pose tracker 934 filters (e.g., Kalman filters) and integrates sensor data to determine at least orientation, and optionally position coordinates of the eyewear frame 924-a, 924-b. The head pose tracker 934 is coupled to and supplies head coordinate information to a graphics processor 932. The graphics processor 932 is coupled to the left eye projector 936-a and the right eye projector 936-b through a left visual signal conduit 932-a and a right visual signal conduit 932-b respectively. The graphics processor renders 3D virtual content to generate left eye and right eye image information for driving the projectors 936-a, 936-b. The coordinates generated by the head pose tracker 934 are used by the graphics processor 932 to maintain the position of virtual content relative to the real world notwithstanding movement of the eyewear frame 924-a, 924-b (along with the user's head). Thus if a virtual character is positioned standing in a doorway of a user's room, the virtual character will remain standing in the doorway if the user rotates their head 30 degrees to the left.

The processing system 900 further includes virtual sound sources 940, 940-1, 940-2 which by way of non-limiting example in the embodiment illustrated in FIG. 9A includes a first virtual sound source 940, a second virtual sound source 940-1 and a third virtual sound source 940-2 it being understood that the number of virtual sound sources can be set arbitrarily. In the typical case that there are more than one of the virtual sound sources 940, 940-1, 940-2 they are all coupled to an audio mixer 902. The audio mixer 902 includes a left mixer output 904 and a right mixer output 906 that are coupled to the input circuitry 910. The internal details of the first virtual sound source 940 are highlighted in FIG. 9 and the remaining virtual sound sources 940-1, 940-2 can have a corresponding design or may differ if the need arises for some specialized application. As shown, the first virtual sound source 940 includes a mono sound source 942 which couples a mono audio stream via an audio signal conduit 944-a and an associated 3D virtual sound source position via a 3D position information signal conduit 944-b to a 3D audio spatializer 946. A third input used by 3D audio spatializer 946 is the user's current head pose (position and orientation), which it receives via a head pose signal conduit 934-2 from the head pose tracker 934. The 3D audio spatializer 946 combines the 3D virtual sound source position and the user's head pose to determine the coordinates of the virtual sound source in a coordinate system fixed to the user's head. This is accomplished by a coordinate transformation. Note that in an augmented reality system the coordinates of the virtual sound source are defined in a coordinate system fixed to the physical environment in which the device 900 is being used. For example a virtual cartoon character may be placed on a real chair in the user's physical room. The purpose of transforming coordinates of the virtual sound source to a coordinate system fixed to the user's head is so that the appropriate "Head Related Transfer Function" (HRTF) may be selected based on the coordinates of the virtual sound source relative to the user's head. A HRTF models the effect of the human head and upper torso on sounds and is elevation, azimuth and distance dependent. An HRTF includes a pair of transfer functions, one for each ear. The presence and particular geometry of a head and torso causes time delay, phase and amplitude differences in the sound arriving at a person's two ears if a sound source is not located on the sagittal plane of the person's head. The time delay, phase and amplitude differences provide cues to a person's auditory system that are used by the brain to sense the direction to a sound source. The time delay, phase and amplitude differences are included in the HRTF for each ear. Thus by applying a chosen HRTF to a sound the sound can be caused to be perceived as emanating from a particular position relative to the person's head that is associated with the chosen HRTF. The stereo audio stream generated by the spatializer 946 is coupled via a pair of stereo audio signal conduits 948a, 948b to an audio mixer 902, which mixes as many sound sources as are present into a combined stereo output that is coupled via a left mixer output 904 and a right mixer output 906 to the input circuitry 910.

The device 900, being an augmented reality device, includes components 926-a, 926-b, 936-a, 936-b mounted in the eyewear frame 924a, 924b that present digital content to a user, while still allowing the user to see through the displays to the real world. Analogously, the audio system the device 900 allows the user to hear generated content with high fidelity while also hearing real world sounds with high fidelity unimpeded by the audio systems of the device 900. Therefore the non-blocking high fidelity audio reproduction capabilities detailed in the preceding figures are an excellent match for devices like 900 that need to display both audio and video without affecting real world sights or sounds. (By contrast, "virtual reality" devices are similar in design, but they block out real world light, so non-blocking audio is not needed).

The video and audio processing system 930 of device 900 can include: hardwired electronics, (such as an Application Specific Integrated Circuit (ASIC), e.g., an audio Coder/Decoder Integrated Circuit (CODEC IC), a video CODEC, a display driver IC); a Field Programmable Gate Array (FPGA); a processor coupled to a memory storing program code that is executed by the processor, or a combination of two or more of the foregoing.

In device 900, the video and audio processing system 930 generates virtual visual content that is output via a left eye visual signal conduit 932a and a right eye visual signal conduit 932b. A difference between the left eye visual output and the right eye visual output of the devices 900 is analogous to the corresponding differences in the real world as seen from a person's left and right eyes. Both contain the same visual content, viewed from a 3D perspective, but the viewing position is slightly different for each eye. The visual projector for the left eye 936-a and the visual projector for the right eye 936-b receive slightly offset graphical images from processing system 930 and output them via the left and right displays 926a, 926b.

Figure 9B:
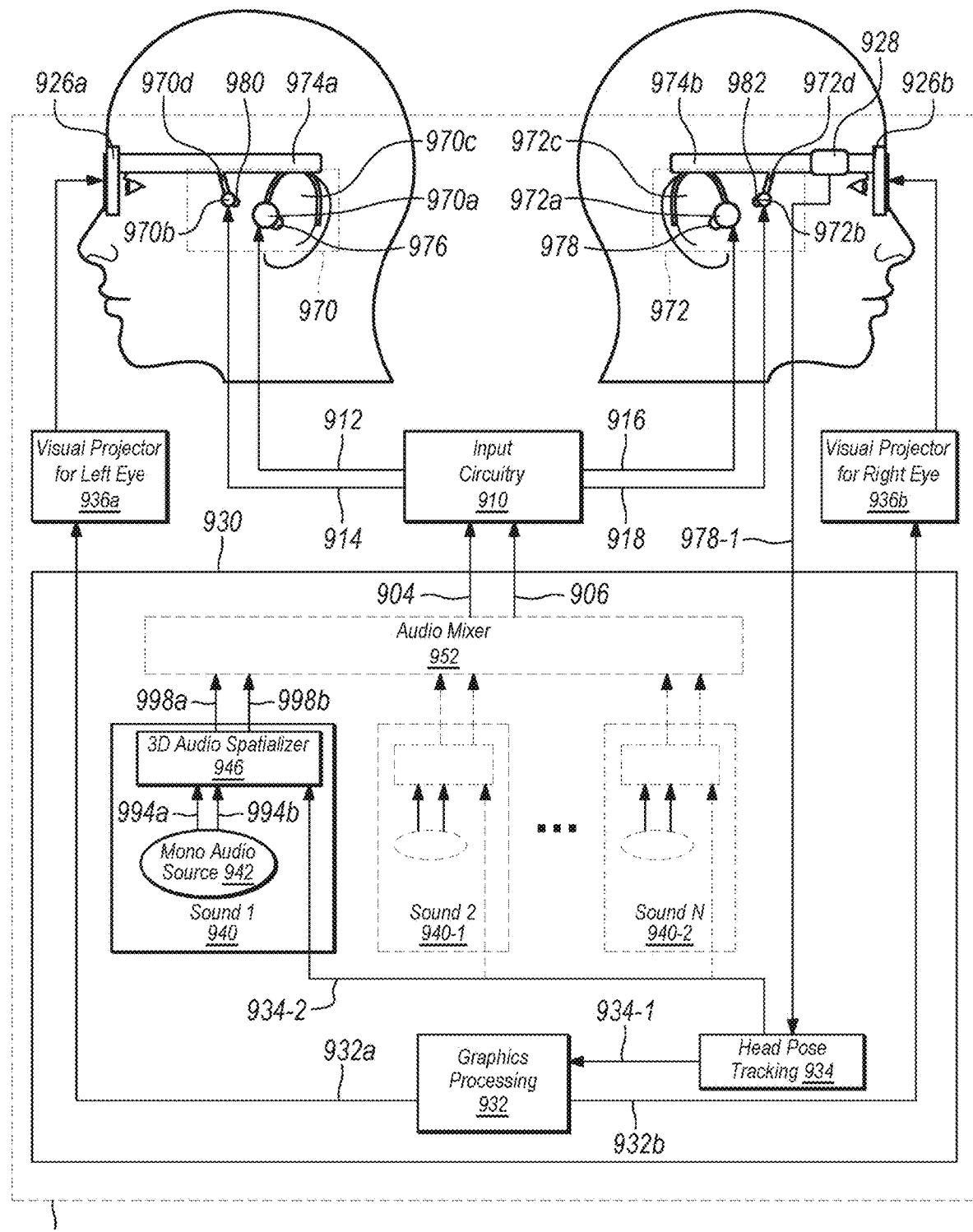
FIG. 9B shows a head-worn (head-wearable) augmented reality device that incorporates the sound reproduction device of FIG. 1B using an alternate form of mounting attachment.

FIG. 9B shows a head-worn augmented reality device 950 according to another embodiment. Many aspects of the device 950 are common to device 900 shown in FIG. 9A and reference is made to the description above for an explanation of those aspects. The head-worn augmented reality device 950 includes an eyewear frame 974-a, 974-b including a left portion 974-a and a right portion 974-b. Device 950 also includes a left augmented reality earphone 970 and a right augmented reality earphone 972. However unlike the more tightly integrated earphones 920, 922 of FIG. 9A, for the earphones 970, 972 the mounting of the woofer components is handled separately from that of the tweeter components. A left ear-clip mounting attachment 970c supports a left woofer component 970a such that a sound outlet 976 of the left woofer component 970a is located within 1.5 centimeters and preferably within 1.2 centimeters of the center of opening of the left ear canal when the eyewear frame 974-a, 974-b is positioned on a typical user wearing an appropriately sized device 950 (The device 950 may be offered in different sizes to fit different user's). Equivalent right side components including a right ear-clip mounting attachment 972-c, a right woofer component 972a and right woofer sound outlet 978 are provided and the right woofer sound outlet 978 is positioned within 1.5 centimeters and preferably within 1.2 centimeters of the center of right ear canal opening when the eyewear frame 974-a, 974-b is positioned on the typical user's head (represented by an IEC 60318-7 audio testing dummy head) for which the head-wearable device 950 is appropriately sized.

A separate left tweeter support structure 970-d that is attached to the left portion 974-a of the eyewear frame 974-a, 974-b supports a left tweeter component 970-b at a position that is spaced from the opening of the user's ear canal. The left tweeter component 970-b includes a left tweeter sound outlet 980. A larger sound stage effect can be obtained when the tweeter component sound outlet 980 is spaced away from the opening of the user's ear canal. The left tweeter sound outlet 980 is suitably spaced from the center of opening of the left ear canal by a distance between ½ and 6 centimeters, and more preferably between 2 and 6 centimeters when the eyewear frame 974-a, 974-b is positioned on a typical user head's wearing an appropriately sized device. Equivalent right side components including a right tweeter support structure 972-d, right tweeter component 972b and right tweeter sound outlet 982 are also provided.

Looking at the left earphone 970 in FIG. 9B, in function it is substantially similar to earphone 170 in FIG. 1B. In fact, one can readily imagine a device that is quite similar to device 950, but in which an earphone substantially similar to earphone 170 of FIG. 1B is used. Indeed, such a configuration is contemplated as an effective form of the invention. However in the case of device 950, the tweeter component 970*b* is not mounted on mounting attachment 970*c* (or an extension from it) as was seen in previous configurations. Instead, tweeter 970*b* is mounted on a mounting attachment extension 970*d*, which is itself attached to the head-spanning mounting attachment 974 that forms the frame for the overall augmented reality device.

Figure 10:
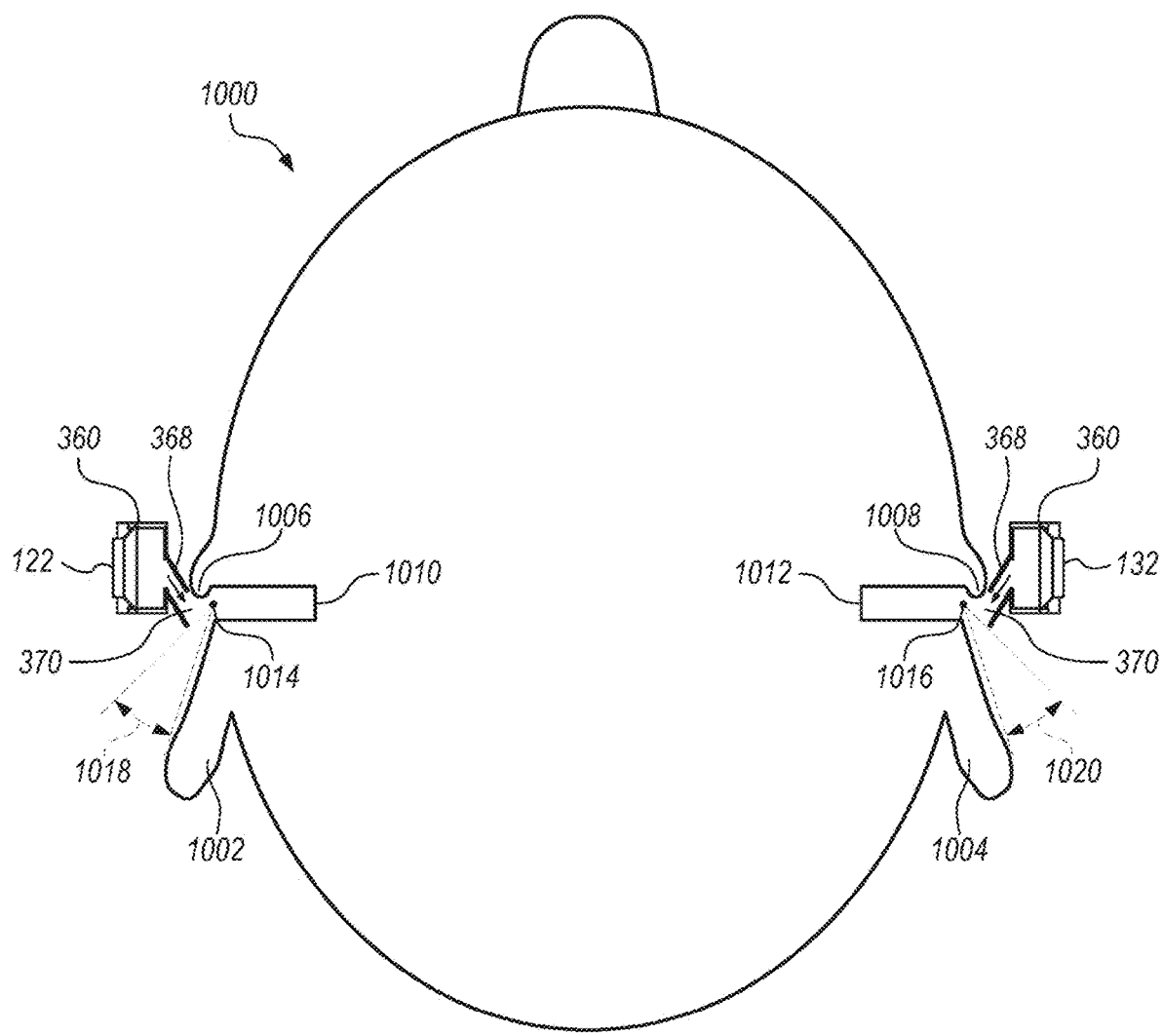
FIG. 10 shows a top cross-sectional view of an audio testing dummy head, with artificial ears and ear canals, and a woofer located next to each ear.

FIG. 10 shows a cross-sectional view of an audio testing dummy head 1000 with artificial ears and ear canals, and speaker components of a head-worn sound reproduction device according the present teachings located next to each ear of the audio testing dummy head 1000. This view shows a different perspective for some of the components seen in FIG. 1A (and other figures), specifically the woofer components 122 and 132. The section plane corresponding to FIG. 10 is indicated in FIG. 1A. In addition, the speaker component 360 of FIG. 3D shows a detailed view of the speaker components shown in FIG. 10. FIG. 10 depicts an audio testing dummy head 1000 that includes a left artificial pinna 1002 and a right artificial pinna 1004, a left artificial tragus 1006 and a right artificial tragus 1008, and a left artificial ear canal 1010 and right artificial ear canal 1012. A pair of left and right speaker components 360 are shown in cross-sectional view, with their sound outlets 370 of their sound tunnels 368 extending only partially over the opening of each ear canal 1010, 1012. As seen from the center of the opening of the ear canal 1014, 1016, the ear canals still have significant "openness" to the outside world, as indicated by the two highlighted solid angles 1018, 1020. According to certain embodiments when the head-worn sound reproduction device is correctly mounted on a user's head or an IEC 60318-7 for audio dummy testing head (for which the device is appropriately sized, as the device may be sold in multiple sizes to fit different size heads), with respect to a center point of an opening of an ear canal, air impermeable portions of the device will subtend between 20% and 80% of a portion of the 4π solid angle about the center point that is not subtended by the audio dummy testing head. Thus, assuming the user's hair is pull away, and no over-the-ear head covering, e.g., hat, or other obstructions which might impede hearing are present, for at least 20% of the solid angle about the center of the opening of the ear canal that is not subtended by the audio testing dummy head (a surrogate for the user) itself there will be a clear line of sight to the ambient environment. Sounds originating in the real-world environment of the user of the mixed reality device including the head-worn sound reproduction devices taught herein will, therefore have a sufficiently low impedance path into the user's ear that hearing such real-world sounds will not be impeded and the real world audio component of the mixed or augmented reality experience will not be degraded; concurrently the close proximity of the sound outlets 370 to the user's ear canal allows for a strong low frequency portion of the virtual audio component of the mixed or augmented reality experience. The inventors have determined, that effective coupling of the higher frequency portion of the virtual audio component can be obtained without the close proximity of the sound outlet of associated tweeters component (not shown in FIG. 10) to the opening of the ear canal and moreover it has been shown that audio spatialization is more effective when the tweeter component sound outlets are spaced from the opening of the ear canal.

Though the illustration of FIG. 10 shows just a single 2D cross section, an understanding of the 3D placement of the speaker components 360 relative to the dummy head 1000 can be readily gleaned by correlating the illustration of FIG. 10 with that of FIG. 1A. It is also noted that the speaker component placement shown in FIG. 10, and the type of speaker components used, represent just one of many possible configurations that can provide a similar or greater level of openness to the outside world, such that sounds from the outside world can be heard with little or no perceptual coloring.

FIG. 11A is a cross sectional view of a first integrated woofer and tweeter component 1100 (referred to herein below as the first integrated component) that may be used as an alternative to the woofer and tweeter components used in the sound reproduction apparatuses shown in FIGS. 1A, 2A and 9A. The first integrated component 1100 includes a woofer driver 1102 having a backside 1103 facing into a woofer back volume 1114 defined by a woofer back enclosure 1111 and a front side 1105 facing into a woofer front volume 1106 defined by a woofer front enclosure 1113. The back enclosure 1111 includes a port 1118 to an ambient environment. A tweeter component 1104 includes a back side 1107 facing into tweeter back volume 1116 defined by a tweeter back enclosure 1115 and a front side 1109 facing into tweeter front volume 1108 defined by a tweeter front enclosure 1117. The woofer front volume 1106 and the tweeter front volume 1108 adjoin and are contiguous with a common front volume 1110 defined by a common enclosure 1119. A woofer front port 1121 is formed between the woofer front enclosure 1113 and the common enclosure 1119. A tweeter front port 1123 is formed between the tweeter front enclosure 1117 and the common enclosure 1119. The common enclosure 1119 includes a sound outlet 1112 opening to an ambient environment for emanating sound to a user's ear.

FIG. 11B is a cross sectional view of a second integrated woofer and tweeter component (referred to herein below as the second integrated component) 1150 that may be used as an alternative to the woofer and tweeter components used in the sound reproduction apparatuses shown in FIGS. 1A, 2A and 9A. The second integrated component 1150 includes a woofer driver 1152 having a back side 1166 facing into a back volume 1160 defined by a back enclosure 1165. The back enclosure 1165 includes a port 1162 to the ambient environment. A front side 1167 of the woofer component 1152 faces into a front volume 1164 defined by a front enclosure 1168. A tweeter driver 1154 is supported in the front volume 1164 in front of the woofer driver 1152. A sound tunnel 1156 has a proximal end connected to the front enclosure 1168 and a distal open end serving as a sound outlet 1158.

Figure 12A:
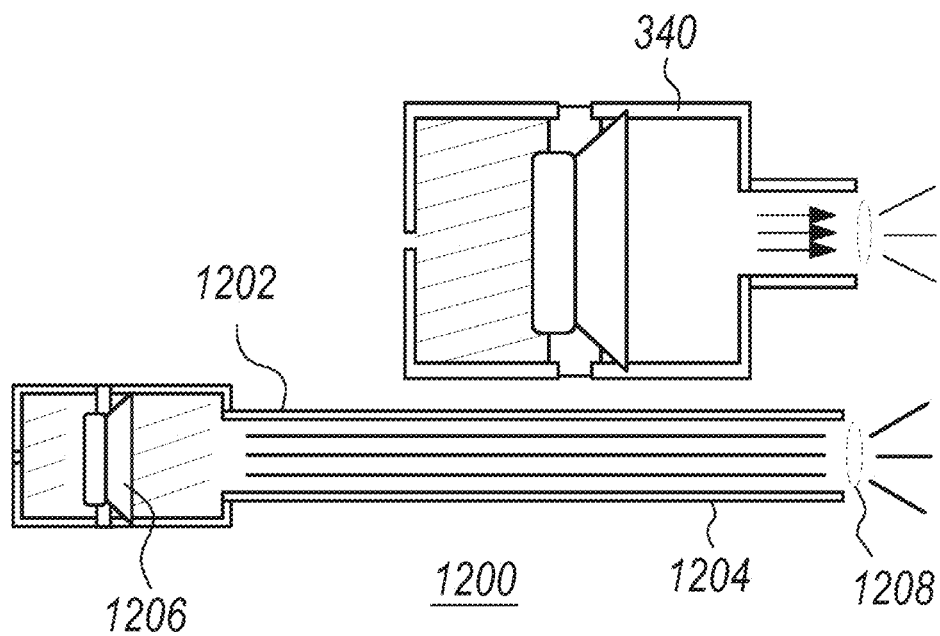
FIG. 12A is a cross sectional view of a first pair of adjacent woofer and tweeter components that may be used as an alternative to the woofer and tweeter components used in the sound reproduction apparatuses shown in FIG. 1A, 1B, 2A, 2B, 9A, 9B.

FIG. 12A is a cross sectional view of an earphone 1200 that may be used as an alternative to the woofer and tweeter components used in the sound reproduction apparatuses shown in FIG. 1A, 1B, 2A, 2B, 9A, 9B. The earphone 1200 includes the speaker component 340 (FIG. 3C) implemented as the woofer and a tweeter 1202. The tweeter 1202 in FIG. 12A is similar in many respects to the speaker component 340 but includes an extended length of the sound tunnel 1204 which is suitably at least 1.5 centimeters long and preferably at least 2 centimeters long, for example 3 centimeters long. The tweeter 1202 includes a speaker driver 1206 positioned proximate a first end of the sound tunnel 1204. A second open end of the sound tunnel serves 1204 as a sound outlet 1208 for the tweeter 1202. As a result, the tweeter sound outlet 1208 is spaced further away from the tweeter speaker driver 1206 than has been seen in previous examples. The advantage of having the longer sound tunnel 1204 is to gain some "expanded sound stage" benefits of spacing the tweeter driver 1206 away from the ear canal, while also gaining some of the privacy benefits of locating a sound outlet 1208 close to the ear canal.

Figure 12B:
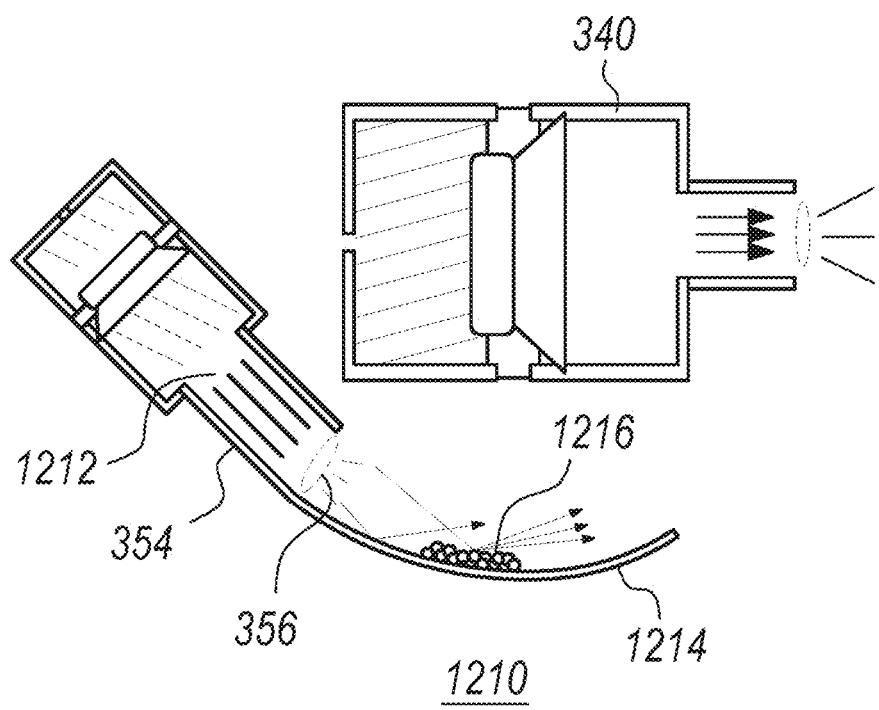
FIG. 12B is a cross sectional view of a second pair of adjacent woofer and tweeter components that may be used as an alternative to the woofer and tweeter components used in the sound reproduction apparatuses shown in FIG. 1A, 1B, 2A, 2B, 9A, 9B.

FIG. 12B is a cross sectional view of an earphone 1210 that may be used as an alternative to the woofer and tweeter components used in the sound reproduction apparatuses shown in FIG. 1A, 1B, 2A, 2B, 9A, 9B. The earphone 1210 includes the speaker component 340 (FIG. 3C) implemented as the woofer and a separate tweeter 1212. The tweeter 1212 in FIG. 12B is similar in many respects to the speaker component 340 but includes a sound-reflecting surface 1214 with an optional sound-softening diffusor 1216 attached at the end of the sound tunnel 354. The sound-reflecting surface 1214 and the sound-softening diffuser 1216 are similar to those shown in FIG. 4C however the sound-reflecting surface 1214 of earphone 1210 is longer than that shown in FIG. 4C, and is suitably 2-3 centimeters in length. Although not clearly visible in the sectional view of FIG. 12B, the sound reflecting surface 1214 can have a compound concave curvature. The shape may be a curved half-pipe shape, a partial toroidal shape, or a portion of a surface of revolution having a conic section generatrix. One example of the latter would be a half ellipsoid shape having one focus at a sound outlet and one focus at a user ear canal opening position. In addition, a portion of the sound-reflecting surface 1214 is used to mount an optional sound-softening diffusor 1216, which somewhat randomizes the directionality of the outputted sound waves (to make them sound less "brittle" and more "diffuse"). The advantage of having an extended sound-reflecting surface is to gain some of the "expanded sound stage" benefits of spacing the tweeter away from the ear canal, while also gaining some of the privacy benefits of locating a sound outlet close to the ear canal. Sound-reflecting surfaces can be attached in a variety of ways, such as to sound tunnels as shown in FIG. 12B, to speaker drivers as shown in FIGS. 4C-4D, and/or to other parts of speaker components such as front volumes, and to other types of mounting attachments.

Figure 13A:
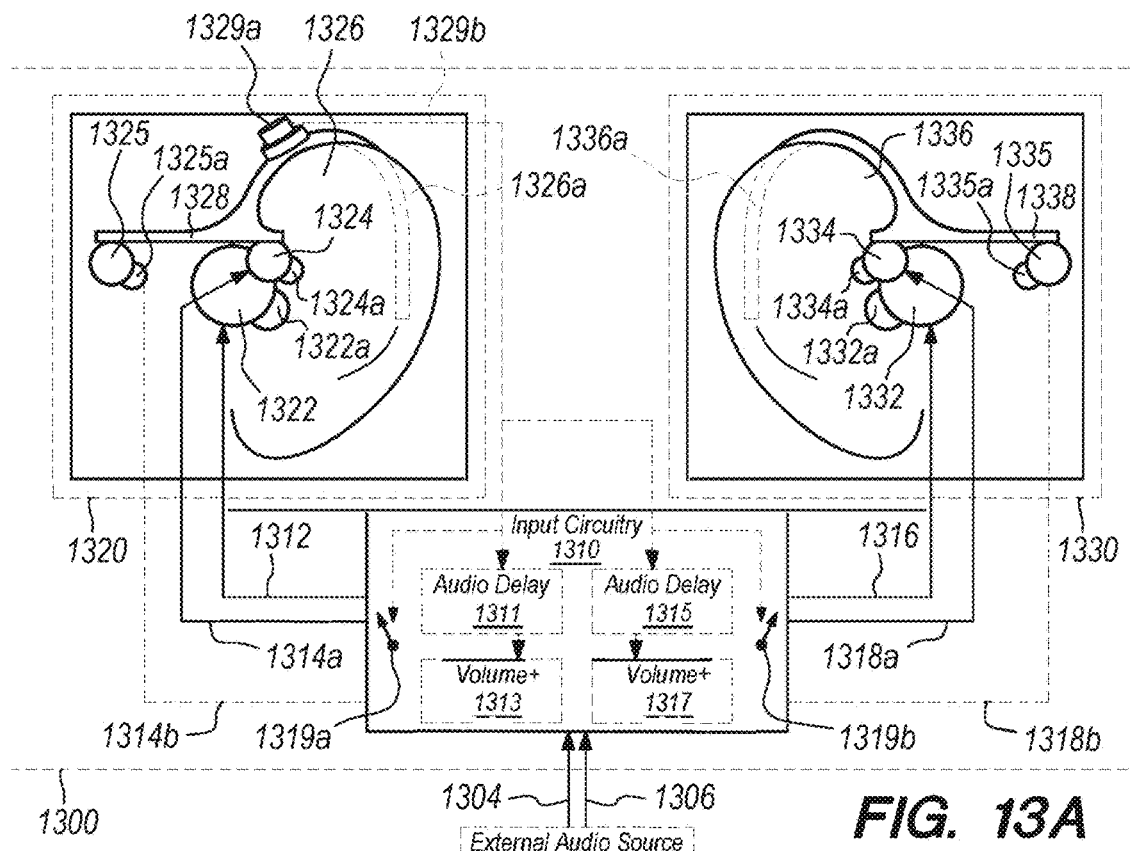
FIGS. 13A-13B show a head-worn (head-wearable) sound reproduction device with (for each ear) a woofer component and two tweeter components, one of the latter being further from the ear canal than the other, with user-activated control to switch between the closer and further tweeter components.
Figure 13B:
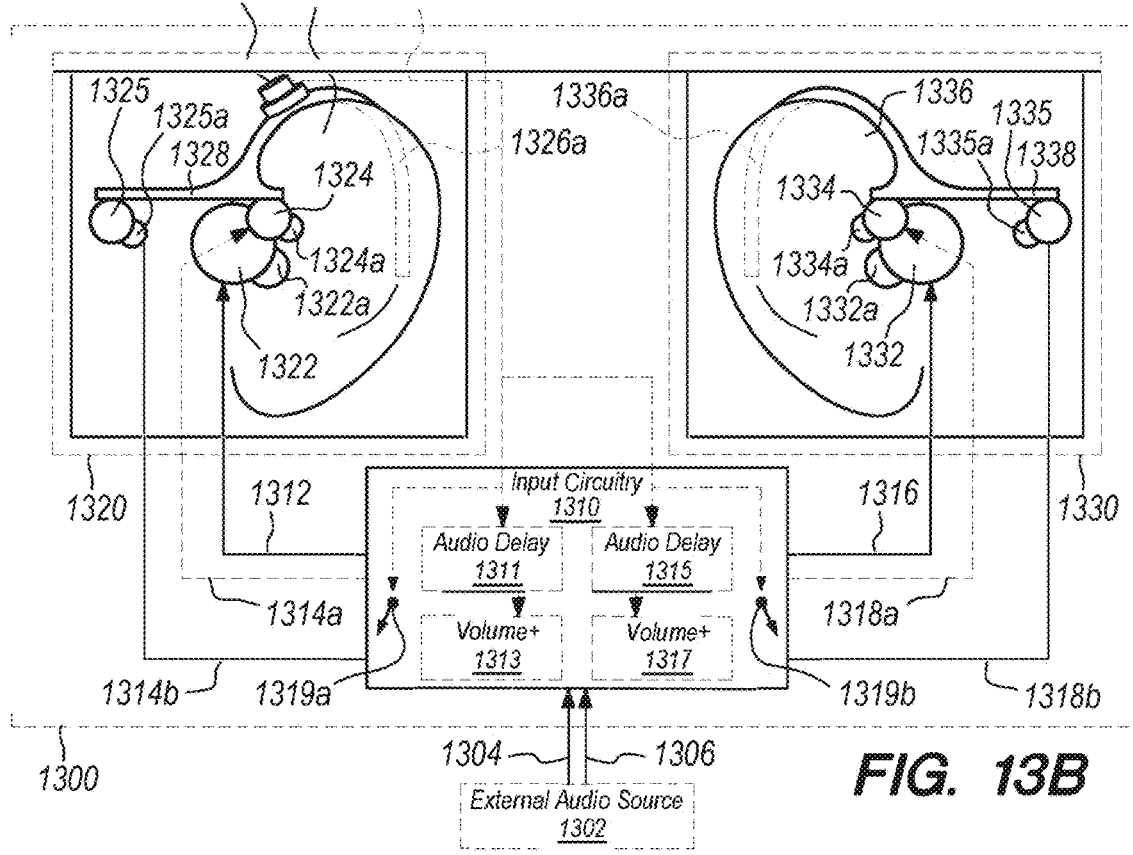

FIGS. 13A-13B shows a head-worn sound reproduction device 1300 including an input circuitry block 1310, a left earphone 1320, a right earphone 1330, and audio signal conduits 1312, 1314-*a*, 1314-*b*, 1316, 1318-*a*, 1318-*b*. In addition, an external audio source 1302 which may not be part of the device 1300 provides a stereo audio signal (1304, 1306) as input. The external audio source 1302 is coupled via a left audio signal conduit 1304 and a right audio signal conduit 1306 to the input circuitry 1310. In the interest of brevity a description will be given with reference mainly to the left earphone 1320, it being understood that the right earphone 1330 has a structure and function that substantially mirrors the left earphone 1320. Unless otherwise indicated, reference numerals of the elements of the right earphone 1330 differ from the reference numerals of the elements of the left earphone 1320 by the substitution of a number 3 in lieu of a number 2 in the third digit. A left woofer signal conduit 1312 couples the input circuitry 1310 to a woofer component 1322. (There is a corresponding right woofer signal conduit 1316) Unlike in previous examples, the device 1300 includes two tweeters per ear. A first left tweeter signal conduit 1314-*a* couples the input circuitry 1310 to a first left tweeter component 1324 that is located close to the user's ear canal. (There is a corresponding first right tweeter signal conduit 1318-*a*). A second left tweeter signal conduit 1314-*b* couples the input circuitry 1310 to a second left tweeter component 1325 that is spaced away from the user's ear canal. (There is a corresponding second right tweeter signal conduit 1318-*b*).

In FIG. 13A, the tweeter pair that is spaced away from the user's ear canals 1325 1335 is currently inactive, as indicated by the dashed tweeter signal conduits 1314-*b* 1318-*b*. For the tweeter pair that is close to the user's ear canals 1324 1334, the solid line of their respective tweeter signal conduits 1314-*a* 1318-*a* indicates that these tweeters are currently active. This enabling of the close tweeters and disabling of the far tweeters can further be seen within the input circuitry block 1310, where on the left side an audio switch 1319-*a* connects the to the near tweeter signal conduit 1314-*a*, and leaves the far tweeter signal conduit 1314-*b* disconnected. The audio source for the audio switch 1319-*a* is the left channel input 1304 coming from the external audio source 1302 (the internal routing of input circuitry block 1310 is not shown due to space constraints). Likewise a right side audio switch 1319-*b* performs a similar role, connecting right channel input 1306 to the near tweeter signal conduit 1318-*a*. The setting of the two audio switches 1319-*a* 1319-*b* is controlled by a control line 1329-*b* that comes from the left earphone 1320, and more specifically from a user-activated button 1329-*a* mounted on the left ear clip 1326 (many forms of user activated switch controls can be effective). In FIG. 13A the user-activated button 1329-*a* is seen in a an "up" position, which corresponds to a state for device 1300 in which its audio performance is substantially similar to that of the devices shown in FIGS. 1A, 2A and 9A.

In FIG. 13B, the user-activated button 1329-*a* has been pressed by the user, as seen by its "down" position. Control line 1329-*b* conveys this new setting to the audio switches 1319-*a* 1319-*b*, which now connect (respectively) to the far tweeter signal conduits 1314-*b* and 1318-*b*, shown with solid lines indicating that the far tweeters 1325 1335 are currently active. Correspondingly, the audio switches 1319-*a* 1319-*b* no longer connect (respectively) to the near tweeter signal conduits 1314-*a* and 1318-*a*, and these are now shown with dashed lines indicating that the near tweeters 1324 1334 are currently inactive. Thus by pressing the user-activated button 1329-*a*, the user has switched device 1300 into a state in which its audio performance is substantially similar to that of the devices shown in FIGS. 1B, 2B and 9B. By pressing the button 1329-*a* again to return it to an "up" position, the user can return the device 1300 to the state shown in FIG. 13A, enabling the user to switch at will between the two states. This capability allows the user to choose quickly and easily between the conflicting goals of privacy versus an expanded "sound stage". The closer distance (FIG. 13A) offers more privacy with less leakage or "bleed", but with a less than maximized "sound stage" due to the proximity to the ears of the tweeter components. The further distance (FIG. 13B) offers less privacy with more leakage or "bleed", but at the same time the "sound stage" becomes expanded due to the greater distance of the tweeter components The left woofer component 1322 includes a sound outlet 1322*a* that is positioned within 1.5 centimeter and preferably within 1.2 centimeters of a center of an opening of the ear canal when the head-worn reproduction device 1300 is properly mounted on a user's head which is taken to be represented by a IEC 60318-7 audio testing dummy head for which the head-wearable device is appropriately sized (it being understood that the device may be offered in multiple sizes). The close proximity of the sound outlet 1322*a* of the woofer component in combination with low frequency extra boost, for example represented by the portion 756-758 of the low pass filter frequency response shown in FIG. 7B, yields a strong, effective bass acoustics notwithstanding the fact that the sound outlet 1322a is not sealingly engaged within the ear canal (as is the case with certain earphones). Accordingly, the user can enjoy strong effective bass acoustics without impairing the user's ability to hear environmental sounds. The ability to hear both environmental sounds and sounds output through the head-worn sound reproduction device 1300 is highly beneficial for mixed or augmented reality devices.

In an optional (but beneficial) enhancement within input circuitry block 1310, the control line 1329-*b* is received by the processing blocks 1311 and 1313 on the left side, and is also received by the processing blocks 1315 and 1317 on the right side. Examining the left side only (and the right side is substantially similar), processing block 1311 is an audio delay similar in role and function to the audio delay 580a in FIG. 5C. Recall that in that case an audio delay 580a can optionally be introduced into the woofer signal chain to correct for a sound-wave arrival-time differential that would otherwise occur when the tweeter is further from the ear canal than the woofer. In device 1300, the 'delay time' parameter of audio delay 1311 is varied based on the setting of the user-activated button 1329-*a* conveyed via the control line 1329-*b*. This mapping is programmed so that the amount of time compensation is always correct, regardless of whether the near or far tweeters are active. The presently preferred 'delay time' goes from 0 microseconds when the near tweeters 1324 1334 are active (as seen in FIG. 13A), up to around 100 microseconds when the far tweeters 1325 1335 are active (as seen in FIG. 13B).

In addition to real time delay control, input circuitry 1310 includes processing block 1313 which is an audio volume (gain) control. This processing block 1313 provides automatic volume (gain) adjustment based on the setting of the user-activated button 1329-*a*, to compensate for the currently active tweeter being closer or further from the ear canal. This ensures that the perceived volume of the tweeter output will remain constant as it switches between the near and far tweeters. Distance verses loudness calculations can be used to determine the mapping between volume and speaker position. The presently preferred 'volume adjust' goes from 0 dB when the near tweeters 1324 1334 are active (as seen in FIG. 13A), up to around 15 dB boost when the far tweeters 1325 1335 are active (as seen in FIG. 13B).

More generally, the head-worn devices detailed within this disclosure offer a unique combination of benefits, namely, head-worn sound reproduction that maintains high fidelity even at low frequencies, heard side by side with real world sounds that are substantially unblocked and clear to the ear. While the audio industry has been working to resolve the gap between these two goals for some time, solutions have proven elusive. The devices presented in this disclosure are the first to succeed in fully closing this gap, an outcome which is both novel and useful, especially for applications in augmented reality and for non-blocked listening in general, where simply stated, the gold standard for audio is that reproduced sounds and real world sounds should both sound "right".

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A wearable head device comprising:
  a left woofer component including a left woofer sound outlet;
  a left tweeter component including a left tweeter sound outlet;
  a left support structure configured to provide mechanical support for the left woofer component and the left tweeter component such that the left woofer sound outlet is spaced from the left tweeter sound outlet by at least ½ centimeters;
  a right woofer component including a right woofer sound outlet;
  a right tweeter component including a right tweeter sound outlet; and
  a right support structure configured to provide mechanical support for the right woofer component and the right tweeter component such that the right woofer sound outlet is spaced from the right tweeter sound outlet by at least ½ centimeters;
  an input configured to receive an audio signal;
  a left woofer output coupled to the left woofer component;
  a left tweeter output coupled to the left tweeter component;
  a right woofer output coupled to the right woofer component;
  a right tweeter output coupled to the right tweeter component;
  a left audio signal filter coupled to the input and drivingly coupled to the left woofer component through the left woofer output, the left audio signal filter configured to apply a first gain to at least a first frequency band in a first frequency range extending from 20 Hz to 100 Hz and further configured to apply a second gain to at least a second frequency band in a second frequency range that extends from 100 Hz, wherein the first gain substantially exceeds the second gain;
  a right audio signal filter coupled to the input and drivingly coupled to the right woofer component through the right woofer output, the right audio signal filter configured to apply the first gain to at least the first frequency band and further configured to apply the second gain to at least the second frequency band; and
  a transmissive display coupled to one or both of the left support structure and the right support structure, the transmissive display configured to rest proximate the eyes of a user of the wearable head device.

2. The wearable head device according to claim 1 wherein:
  the wearable head device further comprises one or more air impermeable portions comprising one or more air impermeable materials; and
  the one or more of the air impermeable portions comprise one or more of the left woofer component, the right woofer component, the left tweeter component, the right tweeter component, the left support structure, and the right support structure.

3. The wearable head device according to claim 1, further comprising a left channel delay between the input and the left woofer output; and a right channel delay between the input and the right woofer output.

4. The wearable head device according to claim 1, wherein the first gain exceeds the second gain by at least 10 dB.

5. The wearable head device according to claim 1, wherein one or more of the left support structure and the right support structure comprises an ear clip mounting structure.

6. The wearable head device according to claim 1, wherein one or more of the left support structure and the right support structure comprises a head spanning mounting structure.

7. The wearable head device according to claim 1, wherein:
- the left audio signal filter comprises a left crossover filter comprising a low pass filter, the left crossover filter having a crossover frequency,
- the second frequency range extends from 100 Hz up to the crossover frequency, and the right audio signal filter comprises a right crossover filter.

* * * * *